(12) United States Patent
Miyamoto et al.

(10) Patent No.: US 9,895,952 B2
(45) Date of Patent: Feb. 20, 2018

(54) TWO-STAGE SWAY BAR

(71) Applicant: TAP Worldwide, LLC, Compton, CA (US)

(72) Inventors: Jason M. Miyamoto, San Diego, CA (US); Sean J. Angues, Corona, CA (US); Jason L. Bennett, Chula Vista, CA (US)

(73) Assignee: TAP Worldwide, LLC, Compton, CA (US)

( * ) Notice: Subject to any disclaimer, the term of this patent is extended or adjusted under 35 U.S.C. 154(b) by 0 days.

(21) Appl. No.: 15/242,991

(22) Filed: Aug. 22, 2016

(65) Prior Publication Data

US 2017/0036506 A1 Feb. 9, 2017

Related U.S. Application Data

(63) Continuation of application No. 14/681,450, filed on Apr. 8, 2015, now Pat. No. 9,463,680.

(60) Provisional application No. 61/977,528, filed on Apr. 9, 2014.

(51) Int. Cl.
*B60G 21/055* (2006.01)

(52) U.S. Cl.
CPC ....... *B60G 21/0556* (2013.01); *B60G 21/055* (2013.01); *B60G 21/0558* (2013.01); *B60G 2202/135* (2013.01); *B60G 2206/427* (2013.01)

(58) Field of Classification Search
CPC ............ B60G 21/0556; B60G 21/0558; B60G 21/055; B60G 2206/427
See application file for complete search history.

(56) References Cited

U.S. PATENT DOCUMENTS

| | | | | |
|---|---|---|---|---|
| 3,085,817 | A * | 4/1963 | Krause | B60G 21/0556 192/85.14 |
| 3,778,082 | A * | 12/1973 | Grosseau | B60G 11/60 267/273 |
| 4,842,298 | A * | 6/1989 | Jarvis | F16F 1/14 267/148 |
| 6,951,341 | B1 | 10/2005 | Beetz et al. | |
| 9,016,703 | B2 * | 4/2015 | Rowe | B60G 21/055 267/273 |
| 9,463,680 | B2 | 10/2016 | Miyamoto et al. | |
| 2008/0106055 | A1 | 5/2008 | Pinkos et al. | |
| 2009/0058020 | A1 | 3/2009 | Ersoy et al. | |
| 2013/0307241 | A1 | 11/2013 | Brown | |

* cited by examiner

*Primary Examiner* — Drew J Brown
(74) *Attorney, Agent, or Firm* — Austin Holt; Eric Severson

(57) ABSTRACT

Sway bars are described that include at least an inner sway bar, a first outer sway bar, and a second outer sway bar. The sway bar includes a first coupling portion and a second coupling portion that can engage and disengage under control from a remote location. The sway bar includes a larger diameter, outer sway bar assembly that can be disengaged and a smaller diameter inner sway bar. The sway bar can include a housing to retain fluid.

14 Claims, 21 Drawing Sheets

TWO-STAGE SWAY BAR

INCORPORATION BY REFERENCE TO RELATED APPLICATIONS

Any and all applications identified in a priority claim in the Application Data Sheet, or any correction thereto, are hereby incorporated by reference herein and made a part of the present disclosure. This application is a continuation of U.S. application Ser. No. 14/681,450, filed Apr. 8, 2015, which claims the priority benefit under 35 U.S.C. §119(e) of U.S. Provisional Application No. 61/977,528 filed Apr. 9, 2014, the disclosure of each is hereby incorporated by reference in its entirety and should be considered a part of this specification.

BACKGROUND OF THE INVENTION

Field of the Invention

The present invention generally relates to sway bars. More particularly, the present invention relates to two-stage sway bars having a disengagable first stage.

Description of the Related Art

A sway bar is part of a vehicle's suspension system and can be referred to as a stabilizer bar. The sway bar reduces vehicle roll during certain maneuvers, such as during fast turns or while traversing certain terrain conditions.

Front and rear sway bars can be used to connect the front and rear wheels, respectively. The function of the sway bar is to transfer force from a first side of the vehicle to a second side of the vehicle. The sway bar typically includes a horizontal bar that extends laterally between the wheels. The bar resists torsion through its stiffness.

The stiffness, and therefore the anti-roll characteristics, is due in large part to the diameter of the sway bar. A larger diameter sway bar tends to keep the vehicle more level while a smaller diameter sway bar allows the body of the vehicle to roll more with the terrain or other maneuver. For certain operations, such a rock crawling, a smaller diameter sway bar is preferred over a larger diameter sway bar to allow the wheels of the vehicle to traverse the terrain. For other operations, such as everyday driving, a larger diameter sway bar is preferred to reduce vehicle roll.

Although sway bars have been in use for a significant period of time, there is a demand for continued improvement in the design and operation of sway bars, especially in sway bars intended for use in certain environments, such as off-road operation. For example, there is a constant push to reduce the stiffness of sway bars during certain driving conditions, while retaining functionality (including anti-roll characteristics) during other driving conditions.

SUMMARY OF THE INVENTION

An embodiment is a sway bar assembly, including an outer sway bar having a first outer sway bar and a second outer sway bar. An inner sway bar is disposed within the outer sway bar. The first outer sway bar includes a first coupling and the second outer sway bar includes a second coupling, wherein the first coupling and the second coupling are configured to be joined or to mate. In some configurations, the sway bar includes a biasing element that biases the first coupling toward the second coupling such that the first coupling and the second coupling mate. A remote activator can be connected to the sway bar assembly. The remote activator can be configured to overcome the force of the biasing element to move the first coupling away from the second coupling such that the first coupling and the second coupling do not mate.

In some arrangements, the sway bar assembly includes engagement features. For example, the first outer sway bar includes an engagement feature configured to complement an engagement feature of the first coupling. The second outer sway bar can include an engagement feature configured to complement an engagement feature on the second coupling. In some embodiments, the engagement feature is a set of longitudinally extending spines on the outer surfaces of the first and second outer sway bars configured to complement a set of longitudinally extending spines on the inner surface of the first and second couplings.

In some arrangements, the first coupling and the second coupling are retained within a housing. The housing is sized and configured to permit sliding of the first coupling with respect to the first outer sway bar to disengage the first coupling from the second coupling. The housing is configured to accept an actuation fluid to move the first coupling relative to the second coupling. The sway bar assembly can include one or more seals that reduce or eliminate the likelihood of actuation fluid escape. The sway bar assembly can include one or more valves to discharge the actuation fluid. The sway bar assembly can include one or more inlets to accept the actuation fluid. In some embodiments, the actuation fluid is a liquid. In other embodiment, the actuation fluid is a gas.

In some configurations, a mounting arrangement has a first hubcap and a second hubcap configured to engage the inner sway bar. The inner sway bar may include an engagement feature to reduce or eliminate the likelihood of rotation of the inner sway bar with respect to the first hubcap and a second hubcap. The first hubcap may couple to a first linking arm and the second hubcap may couple to a second linking arm. The first linking arm can couple to the first outer sway bar and the second linking arm can couple to the second outer sway bar. The first linking arm and the first outer sway bar can include an engagement feature. The second linking arm and the second outer sway bar can include an engagement feature.

An embodiment involves a sway bar assembly, including an outer sway bar comprising a first outer sway bar and a second outer sway bar. The sway bar includes an inner sway bar within the outer sway bar. The sway bar assembly includes a first coupling and a second coupling. A mounting arrangement permits the sway bar assembly to be mounted relative to a set of wheels. The mounting arrangement comprises a first hubcap and a second hubcap coupled to the inner sway bar. A position of the first coupling is adjustable in a longitudinal direction of the sway bar to permit the disengagement of the first coupling and the second coupling. The first coupling is movable against a biasing force to disengage the second coupling.

In some arrangements, the first coupling has a first set of dogs. The second coupling has a second set of dogs. The first set of dogs of the first coupling are configured engage recesses defined within the second set of dogs of the second coupling. The first set of dogs can be unitarily formed with the first coupling. The second set of dogs can be unitarily formed with the second coupling.

In some embodiments, a sway bar assembly is provided. The sway bar assembly can include an outer sway bar assembly. The outer sway bar assembly can include a first outer sway bar, a first coupling portion connected to the first outer sway bar, a second outer sway bar, a second coupling portion connected to the second outer sway bar. The first coupling portion and the second coupling portion can disengagably mate. The sway bar assembly can include a biasing element that biases the first coupling portion toward the second coupling portion such that the first coupling portion and the second coupling portion mate. The sway bar assembly can include inner sway bar disposed within the outer sway bar assembly.

The sway bar assembly can include a remote activator configured to overcome the force of the biasing element to move the first coupling portion away from the second coupling portion such that the first coupling portion and the second coupling portion are separated. The sway bar assembly can include an engagement feature preventing the rotation of the first coupling portion relative to the first outer sway bar. The sway bar assembly can include an engagement feature preventing the rotation of the second coupling portion relative to the second outer sway bar. The sway bar assembly can include a housing, wherein the housing contains the first coupling portion and the second coupling portion. In some embodiments, the housing is sized to permit the sliding of the first coupling portion with respect to the first outer sway bar to disengage the first coupling portion from the second coupling portion. In some embodiments, the housing is configured to accept an actuation fluid to move the first coupling portion relative to the second coupling portion. In some embodiments, the sway bar assembly comprises one or more seals that prevent the escape of the actuation fluid. In some embodiments, the sway bar assembly includes one or more ports through which actuation fluid can pass in and out of the housing. In some embodiments, the actuation fluid is liquid. In some embodiments, the actuation fluid is gas. The sway bar assembly can include a first hubcap and a second hubcap configured to engage the inner sway bar. In some embodiments, the inner sway bar comprises an anti-rotation feature to prevent rotation of the inner sway bar with respect to the first hubcap and the second hubcap.

In some embodiments, a sway bar assembly is provided. The sway bar assembly can include an outer sway bar assembly. The outer sway bar assembly can include a first outer sway bar, a first coupling portion coupled to the first outer sway bar, a second outer sway bar, and a second coupling portion coupled to the second outer sway bar. The sway bar assembly can include an inner sway bar disposed within the outer sway bar assembly. The sway bar assembly can include a mounting arrangement to mount the sway bar assembly to a vehicle wherein the mounting arrangement comprises a first linking arm and a second linking arm coupled together through the inner sway bar and disengageably coupled together through the outer sway bar assembly. In some embodiments, the first coupling portion is movable against a biasing force to disengage from the second coupling portion. In some embodiments, the first coupling portion has a plurality of teeth and the second coupling portion has a corresponding plurality of teeth. In some embodiments, the teeth can be unitarily formed with the first coupling portion and the second coupling portion.

In some embodiments, a sway bar assembly is provided. The sway bar assembly can include an outer sway bar assembly. The outer sway bar assembly can include a first outer sway bar, a first coupling portion configured to longitudinally slide relative to the first outer sway bar, a second outer sway bar, and a second coupling portion. The sway bar assembly can include an inner sway bar disposed within the first outer sway bar and the second outer sway bar.

The sway bar assembly can include a mounting arrangement configured to mount the sway bar assembly to a vehicle wherein the mounting arrangement comprises a first linking arm and a second linking arm. In some embodiments, the first linking arm and the second linking arm are coupled together through the inner sway bar and disengageably coupled together through the outer sway bar assembly. The sway bar assembly can include a biasing element that biases the first coupling portion toward the second coupling portion such that the first coupling portion and the second coupling portion mate. The sway bar assembly can include a remote activator configured to overcome the force of the biasing element to move the first coupling portion away from the second coupling portion such that the first coupling portion and the second coupling portion are separated. The sway bar assembly can include a first engagement feature preventing the rotation of the first coupling portion relative to the first outer sway bar. In some embodiments, the first engagement feature comprises teeth. The sway bar assembly can include a second engagement feature preventing the rotation of the second coupling portion relative to the second outer sway bar. In some embodiments, the second engagement feature comprises teeth. In some embodiments, the teeth can be unitarily formed with the second coupling portion. The sway bar assembly can include a housing, wherein the housing encloses the first coupling portion and the second coupling portion. In some embodiments, the housing is sized to permit the sliding of the first coupling portion with respect to the first outer sway bar to disengage the first coupling portion from the second coupling portion. In some embodiments, the housing is configured to accept an actuation fluid to move the first coupling portion relative to the second coupling portion. In some embodiments, the sway bar assembly comprises one or more seals to prevent the escape of the actuation fluid. The sway bar assembly can include one or more ports through which the actuation fluid can pass in and out of the housing. In some embodiments, the actuation fluid is liquid. In some embodiments, the actuation fluid is gas. The sway bar assembly can include a first hubcap and a second hubcap configured to engage the inner sway bar. In some embodiments, the inner sway bar comprises an anti-rotation feature to prevent rotation of the inner sway bar with respect to the first hubcap and the second hubcap. In some embodiments, the first coupling portion includes dogs. In some embodiments, the second coupling portion includes dogs. In some embodiments, dogs can be unitarily formed with the first coupling portion and the second coupling portion.

In some embodiments, a sway bar assembly is provided. The sway bar assembly can include an outer sway bar assembly. The outer sway bar assembly can include a first outer sway bar, a first coupling portion configured to longitudinally slide relative to the first outer sway bar, a second outer sway bar, and a second coupling portion. The sway bar assembly can include a biasing element that biases the first coupling portion into engagement with the second coupling portion.

The sway bar assembly can include an inner sway bar disposed within the outer sway bar assembly. The sway bar assembly can include a mounting arrangement configured to mount the sway bar assembly to a vehicle wherein the mounting arrangement comprises a first linking arm and a second linking arm. In some embodiments, the first linking arm and the second linking arm are coupled together through the inner sway bar and disengageably coupled together through the outer sway bar assembly. The sway bar assembly can include a remote activator configured to overcome the force of the biasing element to move the first coupling portion away from the second coupling portion such that the first coupling portion and the second coupling portion are separated. The sway bar assembly can include a first engagement feature preventing the rotation of the first coupling portion relative to the first outer sway bar. The sway bar assembly can include a second engagement feature preventing the rotation of the second coupling portion relative to the second outer sway bar. The sway bar assembly can include a housing, wherein the housing encloses the first coupling portion and the second coupling portion. In some embodiments, the housing is sized to permit the sliding of the first coupling portion with respect to the first outer sway bar to disengage the first coupling portion from the second coupling portion. In some embodiments, the housing is configured to accept an actuation fluid to move the first coupling portion relative to the second coupling portion. In some embodiments, the sway bar assembly comprises one or more seals to prevent the escape of the actuation fluid. In some embodiments, the sway bar assembly includes one or more ports through which actuation fluid can pass in and out of the housing. In some embodiments, the actuation fluid is liquid. In some embodiments, the actuation fluid is gas. The sway bar assembly can include a first hubcap and a second hubcap configured to engage the inner sway bar. In some embodiments, the inner sway bar comprises an anti-rotation feature to prevent rotation of the inner sway bar with respect to the first hubcap and the second hubcap.

In some embodiments, a method of using a sway bar assembly is provided. The method can include the step of coupling an inner sway bar with a first linking arm and a second linking arm. The method can include the step of coupling a first outer sway bar with the first linking arm. The method can include the step of coupling a first coupling portion with the first outer sway bar. The method can include the step of coupling a second outer sway bar with the second linking arm. The method can include the step of coupling a second coupling portion with the second outer sway bar. The method can include the step of sliding the first coupling portion relative to the first outer sway bar. The method can include the step of disengaging the first coupling portion from the second coupling portion.

The method can include the step of substantially preventing rotation of the inner sway bar relative to the first linking arm and the second linking arm. The method can include the step of substantially preventing rotation of the first coupling portion relative to the first outer sway bar. The method can include the step of substantially preventing rotation of the second coupling portion relative to the second outer sway bar. In some embodiments, sliding the first coupling portion relative to the first outer sway bar further comprises overcoming a biasing force. In some embodiments, sliding the first coupling portion relative to the first outer sway bar further comprises exerting a pressure on the first coupling portion with a fluid. The method can include the step of releasing the fluid. In some embodiments, disengaging the first coupling portion with the second coupling portion further comprises disengaging dogs of the first coupling portion with dogs of the second coupling portion. The method can include the step of disposing the inner sway bar within the first outer sway bar and the second outer sway bar. In some embodiments, after disengaging the first coupling portion with the second coupling portion, the first outer sway bar and the second outer sway bar do not transmit torque. The method can include the step of engaging the first coupling portion with the second coupling portion such that the first outer sway bar and the second outer sway bar transmit torque as if the first outer sway bar and the second outer sway bar were unitarily formed. In some embodiments, sliding the first coupling portion relative to the first outer sway bar further comprises sliding the first coupling portion away from the second coupling portion. In some embodiments, sliding the first coupling portion relative to the first outer sway bar further comprises sliding the first coupling portion toward the second coupling portion.

In some embodiments, a method of using a sway bar assembly is provided. The method can include the step of coupling an inner sway bar with a first linking arm and a second linking arm. The method can include the step of coupling a first outer sway bar assembly with the first linking arm. The method can include the step of coupling a second outer sway bar assembly with the second linking arm. The method can include the step of engaging the first outer sway bar assembly with the second outer sway bar assembly such that the first outer sway bar assembly and the second outer sway bar assembly transmit torque. The method can include the step of disengaging the first outer sway bar assembly from the second outer sway bar assembly such that the inner sway bar transmits torque.

In some embodiments, engaging the first outer sway bar assembly with the second outer sway bar assembly further comprises biasing a portion of the first outer sway bar assembly toward the second outer sway bar assembly. In some embodiments, engaging the first outer sway bar assembly with the second outer sway bar assembly further comprises releasing a fluid from a chamber. In some embodiments, engaging the first outer sway bar assembly with the second outer sway bar assembly further comprises engaging dogs of the first outer sway bar assembly with dogs of the second outer sway bar assembly. In some embodiments, engaging the first outer sway bar assembly with the second outer sway bar assembly further comprises transmit torque as if the first outer sway bar assembly and the second outer sway bar assembly were unitarily formed. In some embodiments, disengaging the first outer sway bar assembly with the second outer sway bar assembly further comprises exerting a pressure on a portion of the first outer sway bar assembly to overcome a biasing force. In some embodiments, disengaging the first outer sway bar assembly with the second outer sway bar assembly further comprises filling a chamber with fluid to move a portion of the first outer sway bar assembly relative to the second outer sway bar assembly. In some embodiments, disengaging the first outer sway bar assembly with the second outer sway bar assembly further comprises disengaging dogs of the first outer sway bar assembly with dogs of the second outer sway bar assembly. The method can include the step of disposing the inner sway bar within the first outer sway bar assembly and the second outer sway bar assembly. In some embodiments, disengaging the first outer sway bar assembly from the second outer sway bar assembly is performed remotely from within the cab of the vehicle.

BRIEF DESCRIPTION OF THE DRAWINGS

These and other features, aspects and advantages of the present sway bar assemblies are described herein with reference to drawings of certain preferred embodiments, which are provided for the purpose of illustration and not limitation. The drawings contain twenty-one (21) figures.

DETAILED DESCRIPTION

Preferred embodiments of the sway bar assembly include two (or possibly more) sway bars used to alter stiffness and anti-roll characteristics of a vehicle. One or more of the two or more sway bars may include portions that also be referred to as bars, segments or portions herein. However, the use of the term "bar" does not imply any particular cross-sectional shape or configuration. The bar may be any suitable shape that permits the engaging and disengaging of a larger diameter sway bar which surrounds a smaller diameter sway bar. Certain embodiments are illustrated and/or described herein.

Typically, the sway bar assembly controls movement of one wheel relative to another wheel to stabilize the vehicle. The characteristics of the sway bar, including the diameter of the sway bar, will impact the anti-roll characteristics of the vehicle. Often a sway bar is provided that spans between two linking arms, which are mounted relative to the wheels or suspension components of the vehicle. For convenience, the sway bar assembly is referred to as having a driver side and a passenger side. The sway bar assembly has a longitudinal axis which extends from the driver side to the passenger side. These, and other relative terms (top, bottom, above, below, etc.) are used for convenience and with respect to the particular orientation shown in the referenced figures and are not intended to be limiting, unless otherwise indicated or made clear from the particular context. Thus, the sway bar assembly can also be used in other orientations, or adapted for use in orientations other than those illustrated.

The embodiments disclosed herein are well-suited for use in off-road environments. In off-road environments, it is usually preferable to minimize or eliminate the stiffness of the sway bar in order to better traverse the terrain. In contrast, in other conditions, it is usually preferable to minimize vehicle roll by using a sufficiently stiff sway bar. For example, a stiffer sway bar is well-suited for negotiating tighter turns. However, the disclosed embodiments can also be used in, or adapted for use in, other applications as well.

Figure 1:
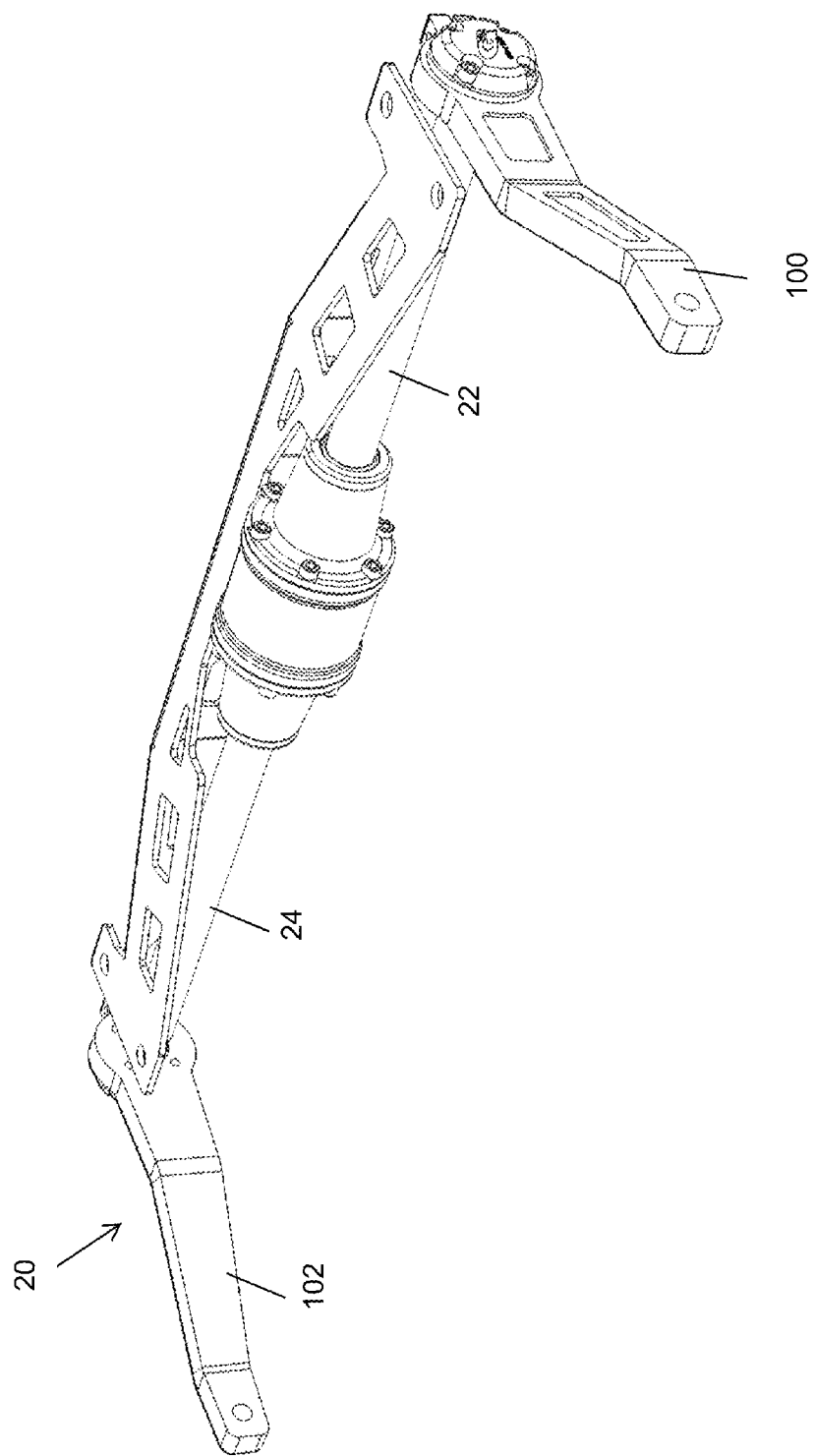
FIG. 1 is a perspective view of a sway bar assembly.
Figure 2:
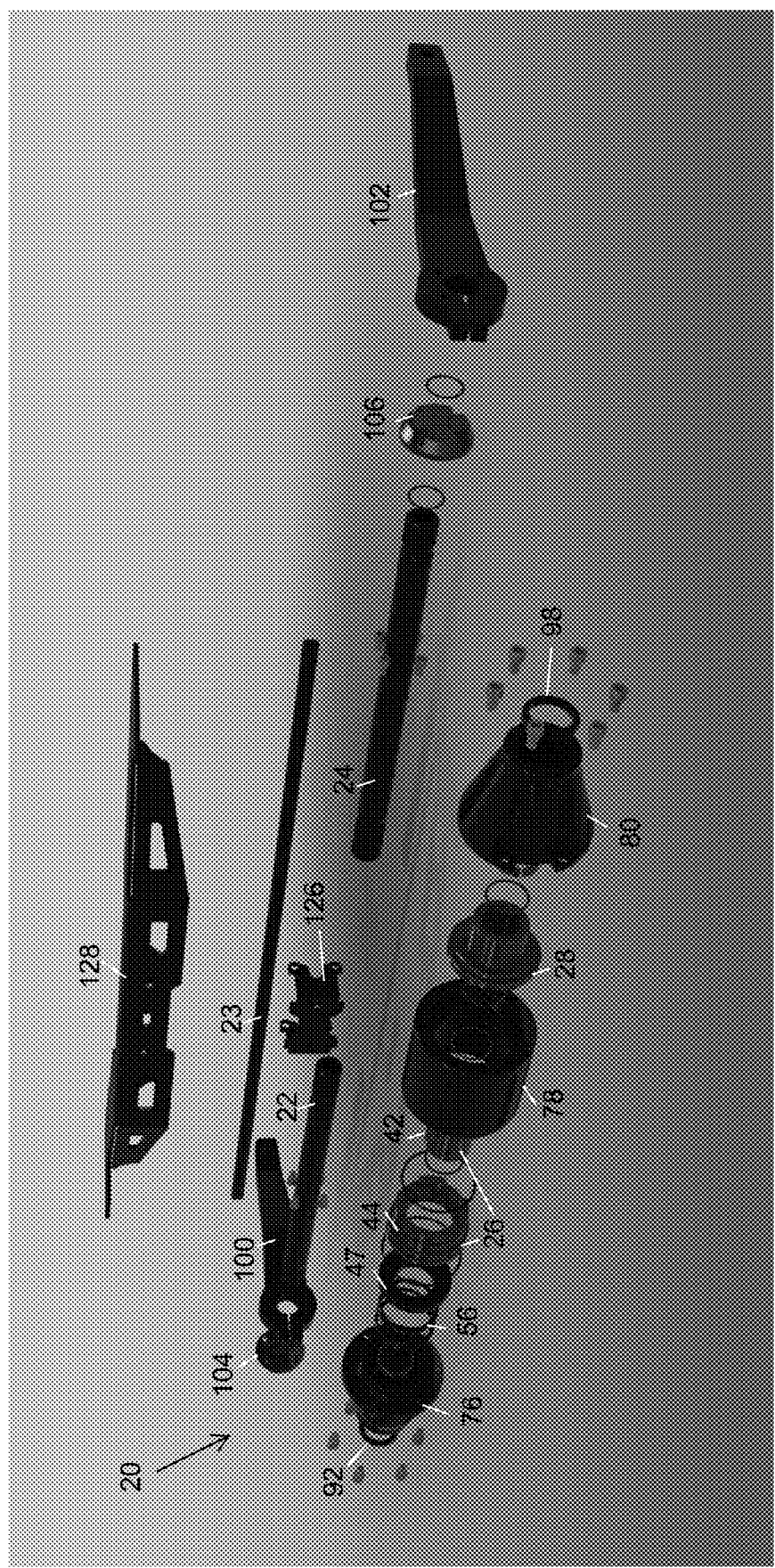
FIG. 2 is an exploded view of the sway bar assembly of FIG. 1.

With reference to FIGS. 1 and 2, a sway bar assembly 20 can include an outer sway bar 21 and an inner sway bar 23. The outer sway bar 21 comprises a first outer sway bar 22 and a second outer sway bar 24 that can be engaged or disengaged to form a rigid body. The outer sway bar further includes a first coupling portion 26 and a second coupling portion 28. One of the couplings 26, 28, or a portion of one of the couplings 26, 28, is movable relative to the other of the couplings 26, 28. In the illustrated arrangement, a portion of the first coupling portion 26 is movable to engage or disengage the second coupling portion 28. However, in other embodiments, this arrangement could be reversed such that the second coupling portion 28, or a portion of the second coupling portion 28 could be movable.

The illustrated sway bar assembly 20 permits adjustment of the stiffness of the sway bar assembly 20 by engaging or disengaging a larger diameter sway bar. The adjustment can be initiated (and/or caused) from within the vehicle compartment. For example, the adjustment can be initiated through a switch or other mechanism accessible to the driver (e.g., within the cab of the vehicle). The adjustment can disengage the larger diameter sway bar. When the larger diameter sway bar is disengaged, a smaller diameter sway bar continues to stabilize the vehicle. When the larger diameter sway bar is engaged, both the larger diameter sway bar and the smaller diameter sway bar stabilize the vehicle.

The illustrated sway bar assembly 20 provides a default position that engages the larger diameter sway bar. The default position is that a first coupling portion 26 and a second coupling portion 28 are engaged or locked together. The default position provides anti-roll characteristics and a stiff sports-car feel for maneuvering on streets and the like. Because the default position engages the larger diameter sway bar, if a chamber that pressurizes to disengage the larger diameter sway bar leaks fluid or otherwise loses pressure, then the sway bar returns to the default (i.e., engaged) position. If the inlet or other features of the fluid exchange fail, then the sway bar remains or returns to the default (i.e., engaged) position.

In the illustrated configuration, the sway bar assembly 20 can be considered to feature a multi-stage sway bar. In some configurations, the sway bar assembly 20 can include a two stage sway bar. The first stage relies on both the inner, smaller diameter sway bar and the outer, larger diameter sway bar to provide stabilization. The second stage relies on only the inner, smaller diameter sway bar to provide stabilization and the outer, larger diameter sway bar is disengaged. The inner sway bar is more compliant, which does not impede articulation of the vehicle to the extent of the larger diameter sway bar. The sway bar assembly 20 can be adjusted from the first stage to the second stage and vice versa from inside the cab of the vehicle. In some embodiments, an activation mechanism can supply fluid to the sway bar assembly 20 to disengage the outer, larger diameter sway bar. The fluid can be discharged such that the sway bar assembly 20 returns to the default position (i.e., the outer, larger diameter sway bar engaged).

In the illustrated arrangement, the first outer sway bar 22 has a length that is substantially equal to a length of the second outer sway bar 24. In some configurations, the first outer sway bar 22 and the second outer sway bar 24 have different lengths with one being shorter than the other. The first outer sway bar 22 and the second outer sway bar 24, when combined, may equal a length of the inner sway bar 23 or may approximately equal the length of the inner sway bar 23, keeping in mind a desire to provide two coaxial sway bars yet allow one of the sway bars to separate along its length. The first outer sway bar 22 and the second outer sway bar 24 may define a hollow circular cross section. The inner sway bar 23 may define a circular or hollow circular cross-section. Other configurations are possible.

In some configurations, one, or both, of the first outer sway bar 22 and the second outer sway bar 24 defines a diameter $D_O$ that is greater than a diameter $D_I$ of the inner sway bar 23. For example, the diameter $D_O$ can be 2 times greater than the diameter $D_I$. For example, in some embodiments, the cross-sectional diameter of the inner sway bar (not including the hubcaps) is less than ¾ inch, less than ⅝ inches, less than ½ inch and, preferably, is ⅝ inches (or any value within the aforementioned range). The inner sway bar 23 can be solid. In some embodiments, the inner sway bar 23 provides a desired low level of vehicle stabilization.

The first outer sway bar 22 and the second outer sway bar 24 can be hollow to accept the inner sway bar 23 therein. The cross-sectional diameter of the outer sway bar (not including the couplings) is less than 1.50 inches, less than 1.25 inch, less than 1 inch and, preferably, is 1.25 inches (or any value within the aforementioned range). The wall thickness of the outer sway bar is less than 5/16 inches, less than ¼ inches, less than 3/16 inches, preferably, is ¼ inches (or any value within the aforementioned range). The inner diameter of the outer sway bar is less than ¾ inch, less than 11/16 inches, less than ⅝ inches, preferably, is 0.7 inches (or any value within the aforementioned range).

The sway bar assembly 20 illustrated in FIGS. 1 and 2 is arranged and configured in accordance with certain features, aspects and advantages of the present invention. In the illustrated arrangement, the sway bar assembly 20 includes three sway bar segments: the first outer sway bar 22, the second outer sway bar 24, and the inner sway bar 23. The inner sway bar 23 is retained within the first outer sway bar 22 and the second outer sway bar 24. In some embodiments, the inner sway bar 23 is coaxial within the first outer sway bar 22 and the second outer sway bar 24.

The sway bar assembly 20 includes the first coupling portion 26 and the second coupling portion 28. One or both of the first coupling portion 26 and the second coupling portion 28 are movable between an engaged position and a disengaged position. In some configurations, as discussed below, the sway bar assembly 20 can include one or more dogs that permit the sway bar assembly 20 to be selectively locked in the engaged position and the disengaged position. In addition, the sway bar assembly 20 may include engagement features (e.g., splines, flutes, gears, etc.) interposed between some or all of the first outer sway bar 22, the second outer sway bar 24, the inner sway bar 23, the first coupling portion 26, the second coupling portion 28, and various other components to couple the components in specified manners. Alternatively, some or all of the segments of the sway bar assembly 20 may include bearing surfaces that permit components to longitudinally slide relative to one another.

The sway bar assembly 20 is configured to be secured to a vehicle, for example in the region of the front wheels of the vehicle. For example, the sway bar assembly 20 includes a first linking arm 100 and a second linking arm 102 that permits the sway bar assembly 20 to be secured to the vehicle. The first linking arm 100 can be joined to a first end of the inner sway bar 23 and/or the first outer sway bar 22 and the second linking arm 102 can be joined to a second end of the inner sway bar 23 and/or the second outer sway bar 24. A first hubcap 104 and a second hubcap 106 can join the first linking arm 100 and the second linking arm 102 with the ends of the inner sway bar 23, for example but without limitation. The first hubcap 104 can be coupled to the first linking arm 100 and the second hubcap 106 can be coupled to the second linking arm 102. Preferably, the first hubcap 104 and the first linking arm 100 can be coupled to the first outer sway bar 22 and the inner sway bar 23 while the second hubcap 106 and the second linking arm 102 can be coupled to the second outer sway bar 24 and the inner sway bar 23. Moreover, the sway bar assembly 20 may be connected to the vehicle in any suitable manner, such as by mounting plates and brackets described herein. In the arrangement illustrated in FIG. 1, the sway bar assembly 20 spans between the driver and passenger sides of the vehicle.

Figure 3:
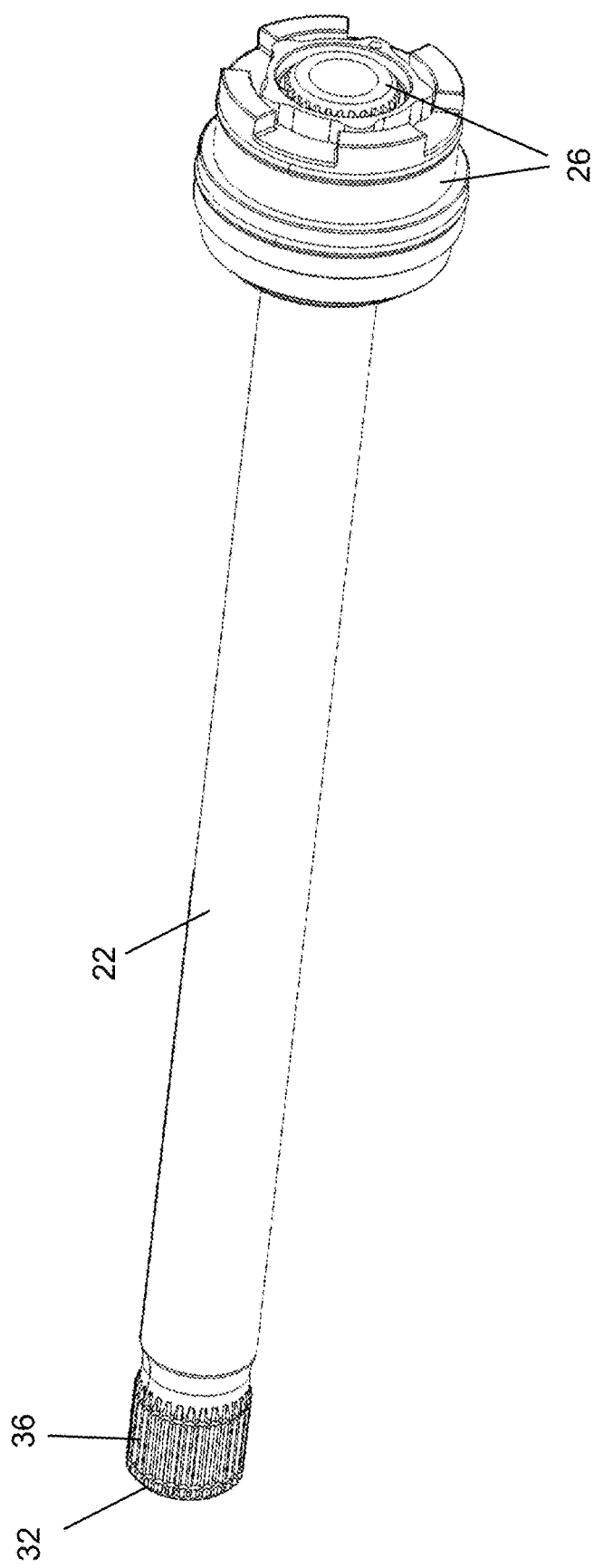
FIG. 3 is a perspective view of a first outer sway bar including a first coupling of the sway bar of FIG. 1.
Figure 4:
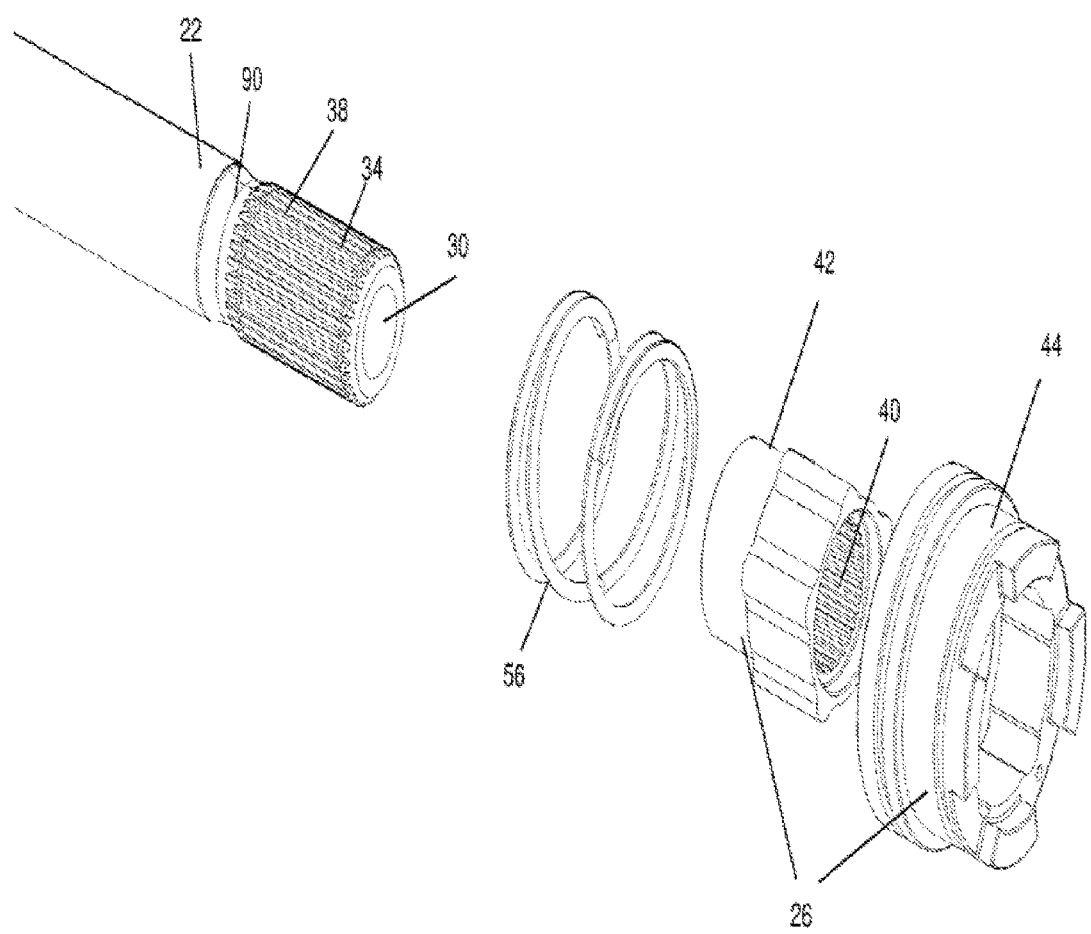
FIG. 4 is an exploded view of the first outer sway bar and the first coupling of FIG. 1.

With reference now to FIGS. 3 and 4, the first outer sway bar 22 can include a central lumen 30. The lumen 30 can accommodate the inner sway bar 23. The first outer sway bar 22 includes a first end 32 and a second end 34. The first end 32 can include an engagement feature 36. In the illustrated embodiment, the engagement feature 36 of the first end 32 is a plurality of teeth. The plurality of teeth can be disposed along an outer surface of the first end 32. The first end 32 engages the first linking arm 100. The first linking arm 100 can include an engagement feature 108 (see FIG. 19) to complement the engagement feature 36 of the first end 32 of the first outer sway bar 22. In the illustrated embodiment, the engagement feature 108 of the first linking arm 100 is a plurality of teeth. The plurality of teeth can be disposed along an inner lumen of the first linking arm 100. The coupling between the first outer sway bar 22 and the first linking arm 100, therefore, can be via a splined connection. Such a configuration is desirable given the forces being transferred through the connection.

The second end 34 of the first outer sway bar 22 can include an engagement feature 38. In the illustrated embodiment, the engagement feature 38 of the second end 34 is a plurality of teeth. The engagement feature 38 of the second end 34 can be different or the same as the engagement feature 36 of the first end 32 of the first outer sway bar 22. The second end 34 of the first outer sway bar 22 engages the first coupling portion 26. The first coupling portion 26 can include an engagement feature 40 to complement the engagement feature 38 of the second end 34. In the illustrated embodiment, the engagement feature 40 of the first coupling portion 26 is a plurality of teeth. In some embodiments, the second end 34 can include one or more retaining members (e.g., O-rings) that facilitate the retention of second end 34 of the first outer sway bar 22 within the first coupling portion 26.

The engagement features facilitate the coupling of components. In some embodiments, the engagement features described herein can include gears, teeth, flutes, splines, grooves, channels, keys or any other feature known in the art to couple components. In some embodiments, the engagement features prevent rotation of one component relative to another component. In some embodiments, the engagement features support movement of the components while maintaining the engagement of components. For example, the engagement features extend longitudinally, permitting longitudinally sliding of the components relative to each other. In some embodiments, the engagement features are constructed of a material for low sliding resistance and durability.

Moveable Sleeve

FIGS. 5-8 are perspective and exploded views of the first coupling portion 26. The first coupling portion 26 can be configured for selective decoupling with the second coupling portion 28. In other words, the first coupling portion 26 can include at least one component that is configured to selectively couple with the second coupling portion 28.

Figure 5:
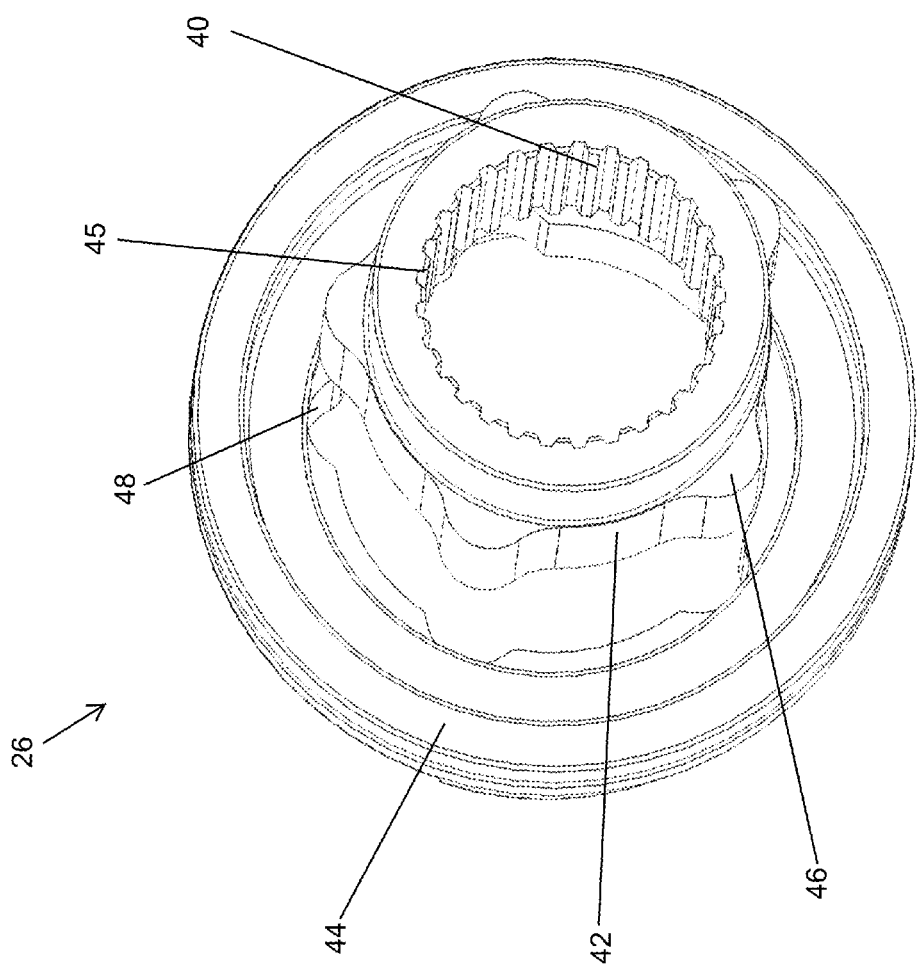
FIG. 5 is an exploded view of the first coupling of FIG. 1.

As shown in FIG. 5, the illustrated first coupling portion 26 comprises a hub 42 and a movable sleeve 44. The hub 42 can include the engagement feature 40 that complements the second end 34 of the first outer sway bar 22. In the illustrated embodiment, the engagement feature 40 of the hub 42 can include a plurality of teeth that are arranged and configured to engage the teeth of the second end 34 of the first outer sway bar 22. The plurality of teeth can be disposed along an inner lumen 45 of the hub 42. Thus, a splined coupling can be defined between the hub 42 and the first outer sway bar 22.

The hub 42 can include a second engagement feature 46 to engage a portion of the movable sleeve 44. In the illustrated embodiment, the hub 42 can include a plurality of radially outwardly projecting ridges. The plurality of ridges can be disposed along an outer surface of the hub 42. In some configurations, the ridges slope gently between peaks and valleys. The plurality of ridges can form a flower-petal shape, as shown.

The movable sleeve 44 can include a second engagement feature 48 to complement the second engagement feature 46 (i.e., the ridges) of the hub 42. In the illustrated embodiment, the movable sleeve 44 can include a plurality of recesses to engage the ridges of the hub 42. The plurality of recesses can be disposed along an inner lumen 49 of the movable sleeve 44. In the illustrated configuration, the recesses receive only a portion of the full height of the ridges. While the illustrated configuration is generally symmetrical, it is possible to have asymmetric or a patterned configuration as well in which the height or radial width of the each of the ridges are not consistent one to the next. In the illustrated configuration, the interfacing portions of the second engagement features 46, 48 are generally smooth without sharp points. Other configurations are possible.

The hub 42 is configured to be received within the movable sleeve 44 with the second engagement features 46, 48 engaged with each other. The first coupling portion 26 can be considered a shuttle mechanism with the movable sleeve 44 shuttling on the hub 42 while the second engagement features 46, 48 of the first coupling portion 26 maintain a desired axial orientation of the movable sleeve 44 relative to the hub 42. The movable sleeve 44 can shift axially between a first position and a second position. In some embodiments, the movable sleeve 44 is the only axially shiftable component 44 of the sway bar assembly 20. The second engagement features 46, 48 reduce or eliminate the likelihood of rotation of the movable sleeve 44 with respect to the hub 42 and, therefore, the first outer sway bar 22. Reducing or eliminating the likelihood of rotation of the movable sleeve 44 enables the first coupling portion 26 to properly engage with the second coupling portion 28, as described below.

Figure 6:
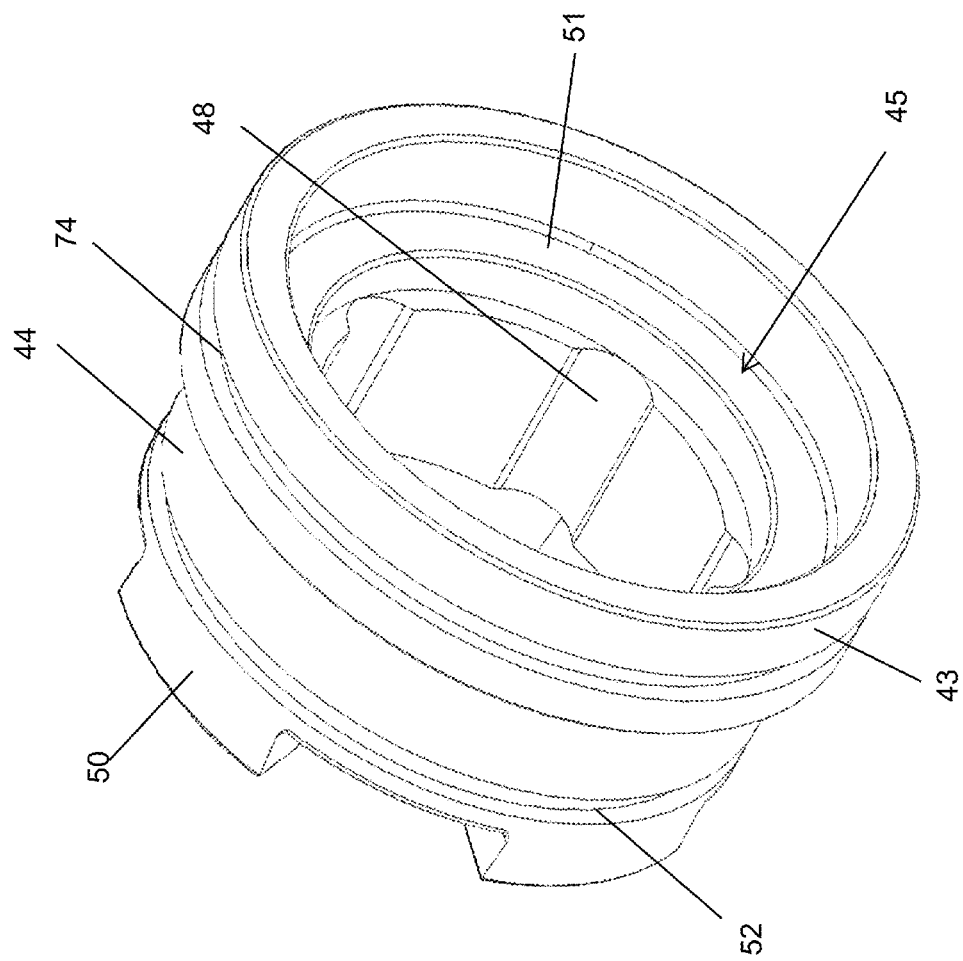
FIG. 6 is a perspective view of the movable component of FIG. 1.
Figure 7:
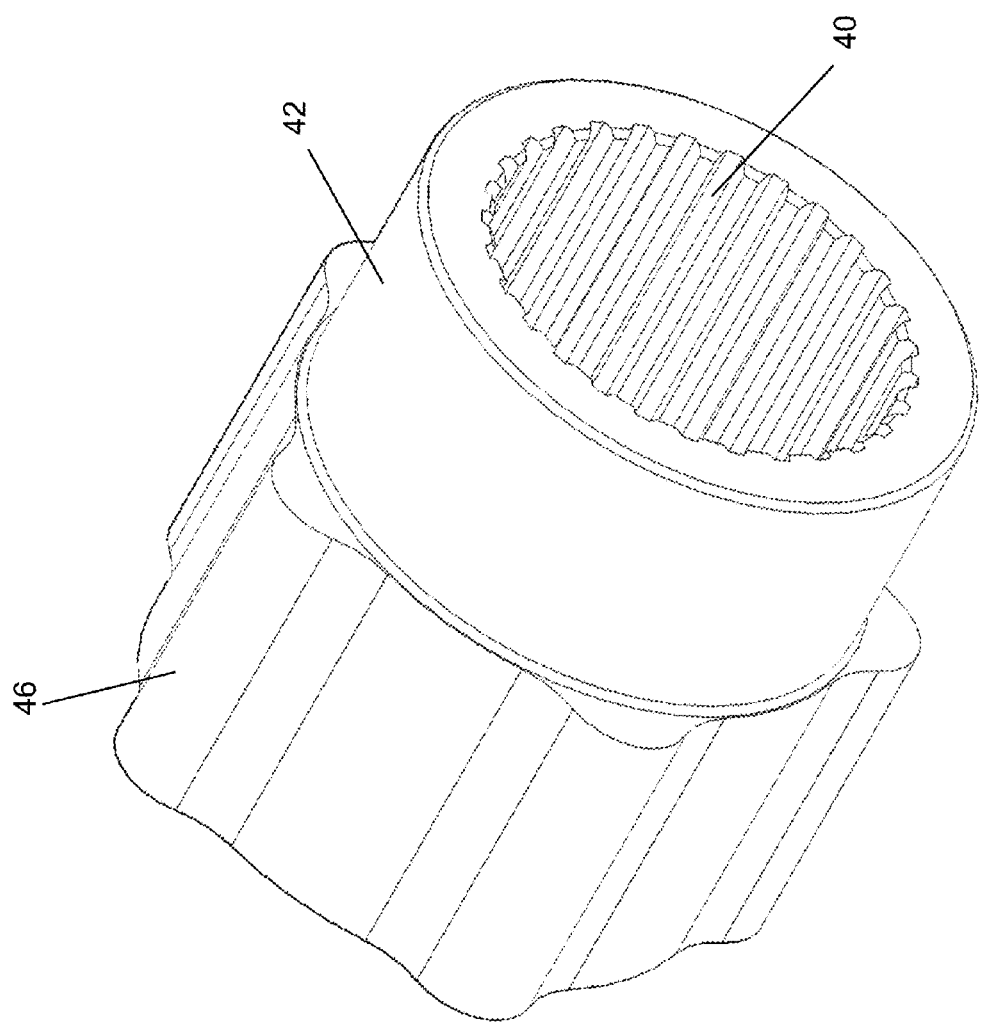
FIG. 7 is a perspective view of the hub of FIG. 1.
Figure 15:
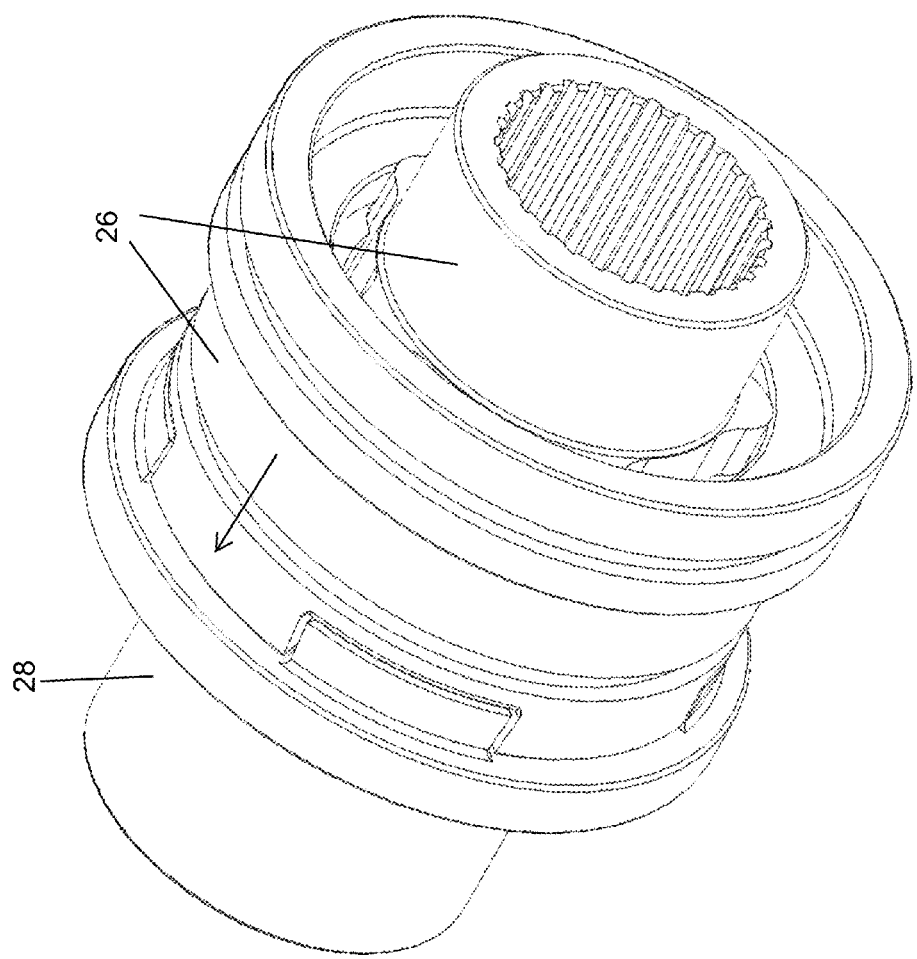
FIG. 15 is a perspective view of the first coupling and the second coupling of FIG. 1 engaged with each other.
Figure 16:
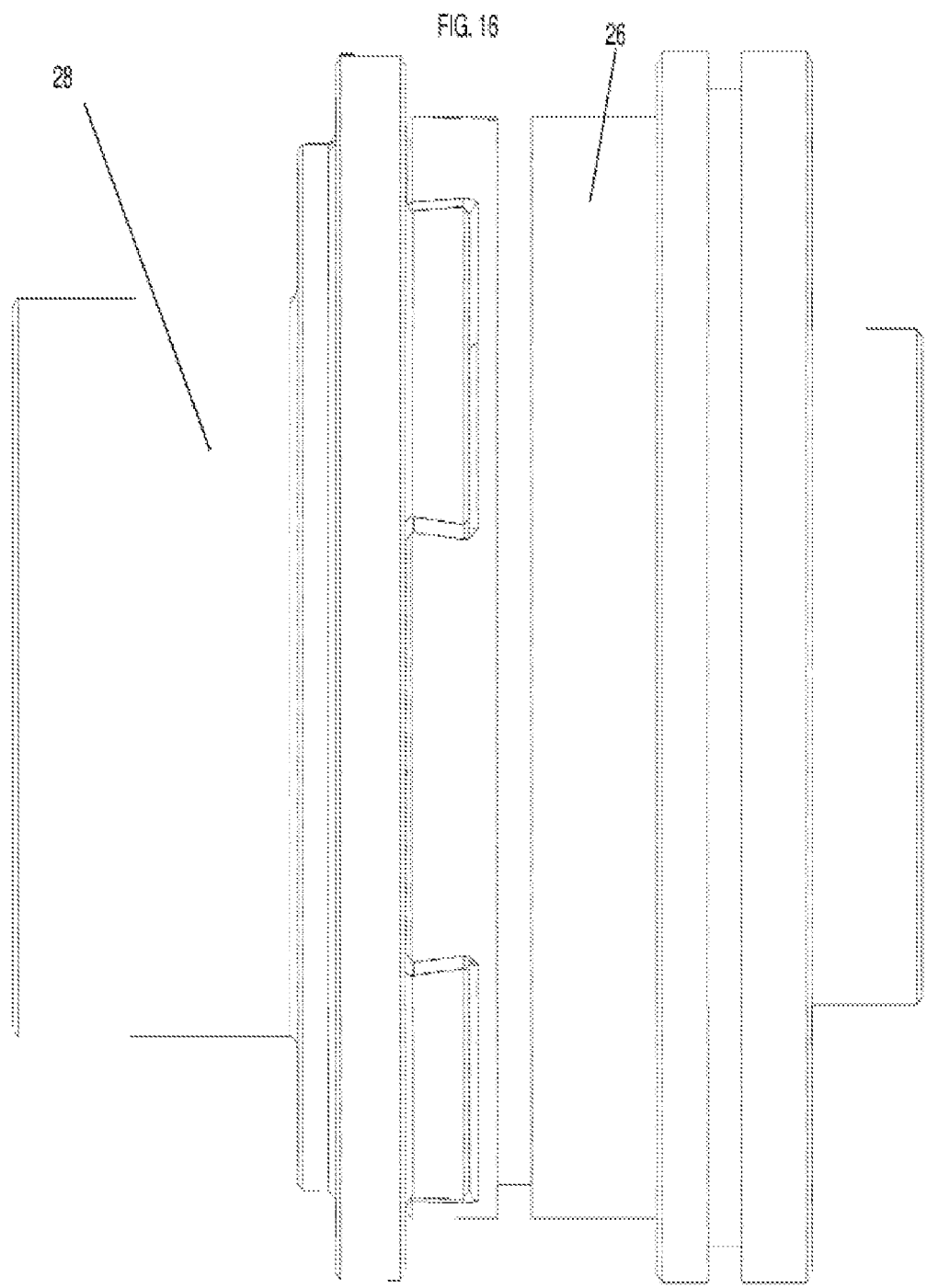
FIG. 16 is a side view of the first coupling and the second coupling of FIG. 1 engaged.

Referring back to FIG. 2, the movable sleeve 44 and the second coupling portion 28 can define a clutch. In some configurations, the movable sleeve 44 and the second coupling portion 28 can define a dog clutch. Referring to FIG. 6, the movable sleeve 44 includes a plurality of teeth 50 and engagement surfaces (i.e., the recesses) disposed between the plurality of teeth 50. The teeth 50 are shaped to interlock with the teeth 72 of the second coupling portion 28 and abut the engagement surfaces (i.e., the recesses) of the second coupling portion 28, as shown in FIGS. 15 and 16. As shown in FIG. 6, the teeth 50 are located on a forward face of the movable sleeve 44. The teeth 50 extend longitudinally (i.e., axially) along the axis of the sway bar assembly 20. The illustrated embodiment shows four teeth 50 on the movable sleeve 44, but fewer or greater numbers of teeth are contemplated (e.g., three, four, five, six, seven, eight, nine, ten). The illustrated embodiment shows equally spaced teeth 50 on the movable sleeve 44, but different configurations are contemplated. Preferably, the teeth 50, 72 are offset from one another (e.g., rotated clockwise with respect to each other) to permit interlocking. If the teeth 50, 72 are slightly misaligned, then the teeth 50, 72 will mash together until alignment is reached due to the biasing force of a spring 56. In some embodiments, the teeth 50, 72 will rarely interlock out of phase (e.g., rotated so the teeth 50 are misaligned-indexed one slot from a desired position) based on the inherent limits of vehicular roll and based on the number of degrees of rotation between the second coupling portion 28 and the first coupling portion 26 (i.e., movable sleeve 44).

Referring to FIGS. 2-5, the first outer sway bar 22 is held in rotational position relative to the first linking arm 100 by the engagement feature 36 of the first end 32 coupled with the engagement feature 108 of the first linking arm 100. The hub 42 is held in rotational position relative to the first outer sway bar 22 by the engagement feature 40 coupled with the engagement feature 38 of the second end 34 of the first outer sway bar 22. The movable sleeve 44 is held in rotational position relative to the hub 42 by the second engagement feature 48, which is rotationally coupled with the second engagement feature 46 of the hub 42. Thus, the movable sleeve 44 generally is fixed against rotation (as opposed to rotation caused by torsion of the first outer sway bar 22) relative to the first linking arm 100.

Fluid Chamber

Figure 13:
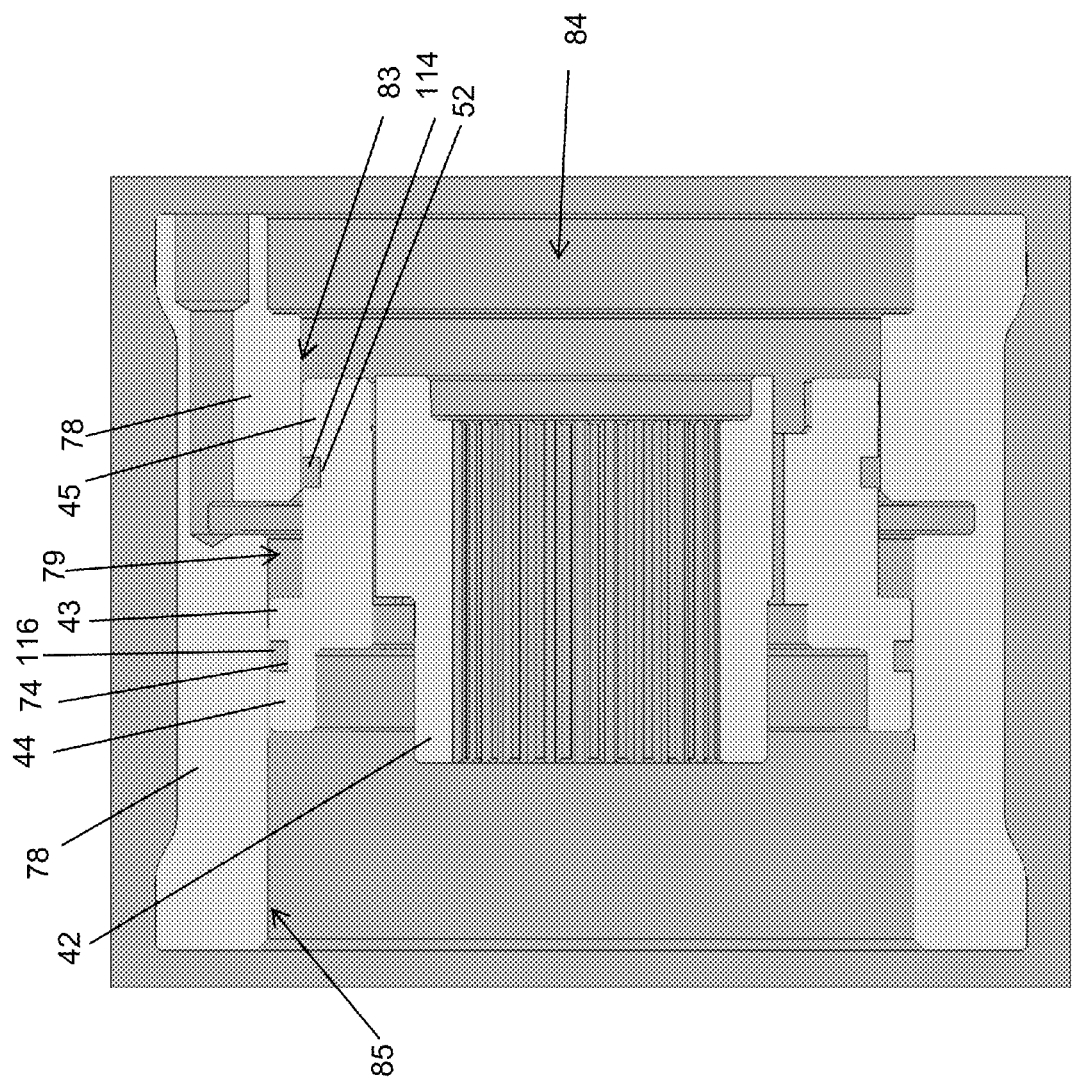
FIG. 13 is a longitudinal cross-sectional view of the central segment of the housing taken along the line 11-11 of FIG. 11.
Figure 14:
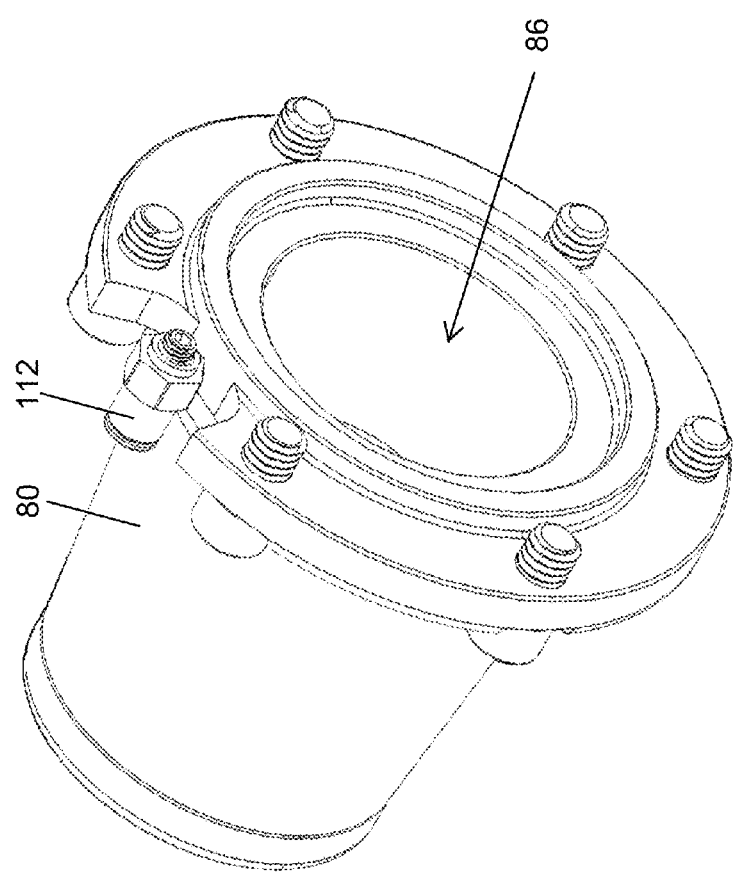
FIG. 14 is a perspective view of the second segment of the housing of FIG. 1.

As shown in FIGS. 6 and 13, the outer surface of the movable sleeve 44 can include a plurality of circumferential grooves. In some embodiments, the movable sleeve 44 can include a first groove 52 and a second groove 74. A first sealing member 114 (see FIG. 13) is configured to be retained in the groove 52 and a second sealing member 116 (see FIG. 13) is configured to be retained in the groove 74. The sealing members 114, 116 can be O-rings, for example but without limitation.

In the illustrated configuration, the outer surface of the movable sleeve 44 can have at least two diameters. The outer surface of the movable sleeve 44 can have a larger diameter 43 toward the hubcap 104. The outer surface of the movable component can have a smaller diameter toward the teeth 50. The first groove 52 can be located on the smaller diameter section of the movable sleeve 44, closer to the teeth 50. The second groove 74 can be located on the larger diameter section 43 of the movable sleeve 44, closer to the hubcap 104. The sealing members 114, 116 create a seal between the movable sleeve 44 and the housing, as describe herein.

Referring to FIGS. 6 and 13, as described above, the inner surface of the movable sleeve 44 can be defined by the lumen 45. The illustrated lumen 45 can be stepped. In other words, the illustrated lumen 45 can include a first portion that is smaller in diameter and a second portion that is larger in diameter. The smaller diameter portion can be positioned within the portion of the moveable sleeve that includes the second engagement feature 48. The larger diameter portion can be positioned within the portion of the movable sleeve 44 that underlies the second groove 74.

The stepped lumen 45 provides space for a spring 56 to be disposed within the movable sleeve 44. The lumen 45 in the illustrated sleeve 44 includes a stepped surface 51 that extends in a generally radial direction. The stepped surface 51 defines a bearing surface for the spring 56. The spring 56 can abut the stepped surface 51 in the lumen 45 to bias the movable sleeve 44 toward the second coupling portion 28.

The sway bar assembly 20 can include an additional spacer 47, shown in FIGS. 2 and 13. The spacer 47 can define an additional surface against which the spring 56 can bear. Thus, the spring 56 can be compressed between the spacer 47 and the stepped surface 51 of the movable sleeve 44. In some configurations, the spacer 47 can define a mechanical stop for the movable sleeve 44. Thus, in some configurations, the spacer 47 can help limit the axial travel of the sleeve 44 along the first outer sway bar 22 and, thereby, also limit compression of the spring 56. In some configurations, the spacer 47 can bear against a surface of the first outer sway bar 22.

Figure 8:
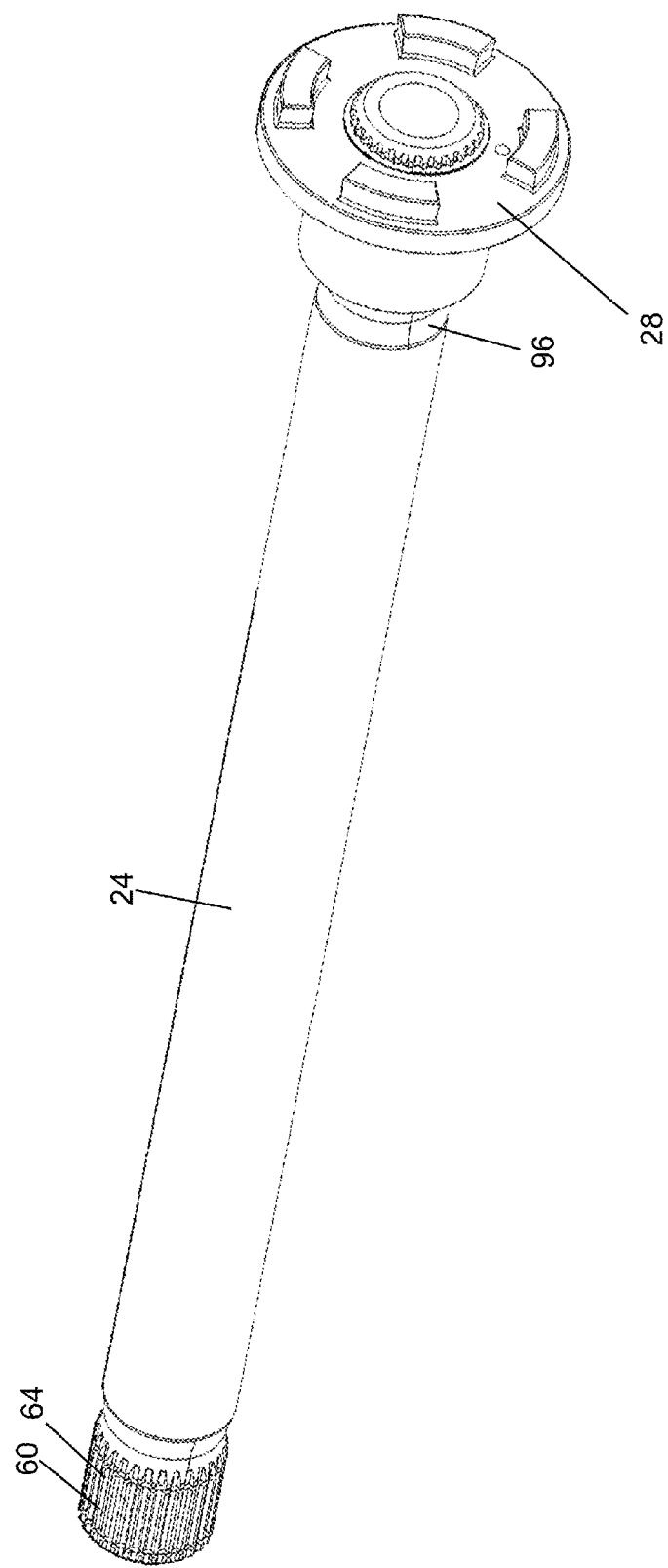
FIG. 8 is a perspective view of a second outer sway bar including a second coupling of the sway bar of FIG. 1.
Figure 9:
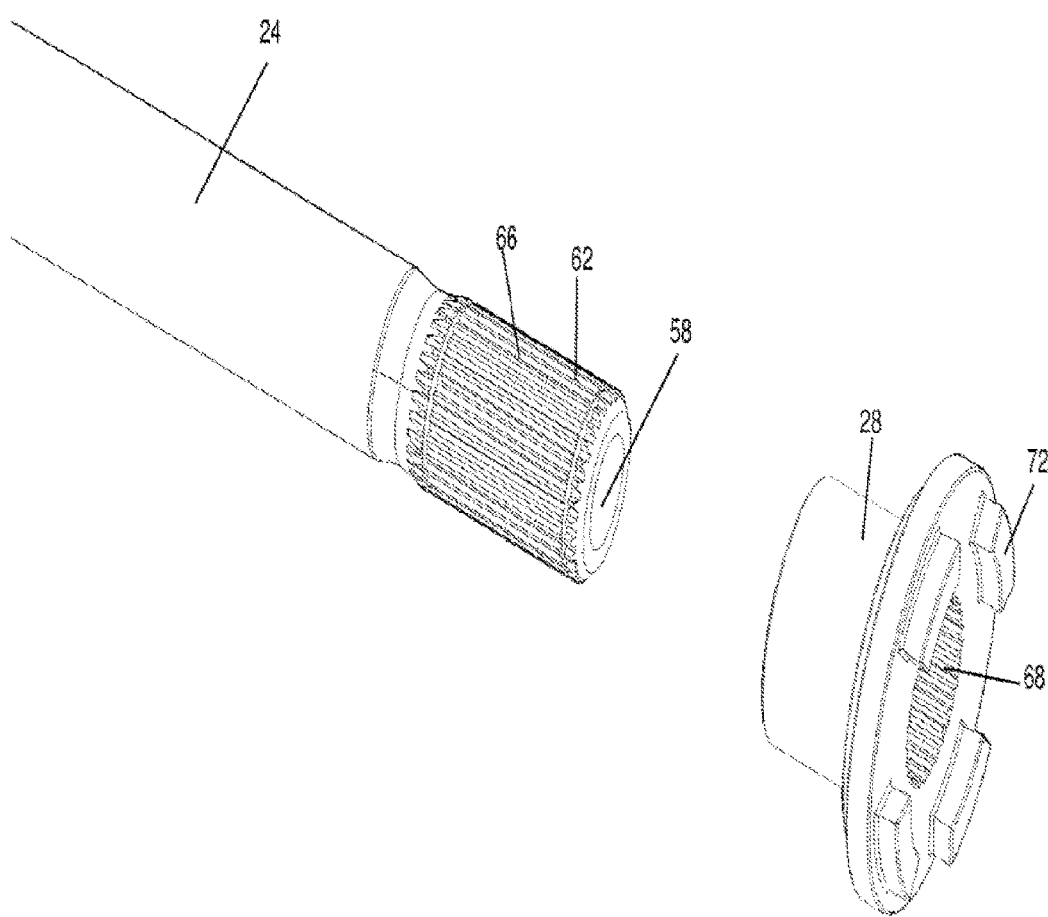
FIG. 9 is an exploded view of the second outer sway bar and the second coupling of FIG. 1.
Figure 10:
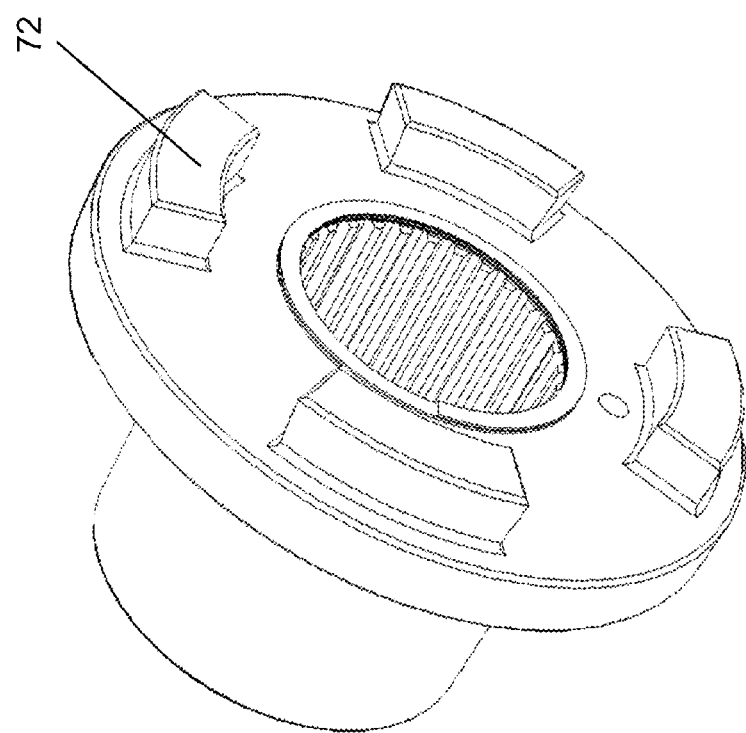
FIG. 10 is a perspective view of the second coupling of FIG. 1.

FIGS. 8-10 are perspective and exploded views of the second outer sway bar 24 and the second coupling portion 28. The second outer sway bar 24 can include a central lumen 58 through which the inner sway bar 23 can extend. Like the first outer sway bar 22, the inner sway bar 23 can extend fully through the second outer sway bar 24 as well.

The second outer sway bar 24 includes a first end 60 and a second end 62. The first end 60 can include an engagement feature 64. In the illustrated embodiment, the engagement feature 64 of the first end 60 is a plurality of teeth. The plurality of teeth can be disposed along an outer surface of the first end 60. The first end 60 engages the second linking arm 102 (see FIG. 2). The second linking arm 102 can include an engagement feature (not shown) to complement the engagement feature 64 of the first end 60. In the illustrated embodiment, the engagement feature of the second linking arm 102 can be a plurality of teeth. The plurality of teeth can be disposed along an inner lumen of the second linking arm 102, similar to the first linking arm 100 shown in FIG. 19.

The second end 62 also can include an engagement feature 66. The engagement feature 66 of the second end 62 can be different or the same as the engagement feature 64 of the first end 60. In the illustrated embodiment, the engagement feature 66 of the second end 62 is a plurality of teeth. The plurality of teeth can be disposed along an outer surface of the second end 62.

With reference to FIG. 9, the second end 62 engages the second coupling portion 28. The second coupling portion 28 can include an engagement feature 68 to complement the engagement feature 66 of the second end 62 of the second outer sway bar 24. In the illustrated embodiment, the engagement feature 68 of the second coupling portion 28 is a plurality of teeth. The plurality of teeth can be disposed along an inner lumen of the second coupling portion 28. In some embodiments, the second end 62 can include a retaining member (e.g., O-rings).

As mentioned above, the movable sleeve 44 and the second coupling portion 28 can define a clutch. Referring to FIG. 10, the second coupling portion 28 includes a plurality of teeth 72 and an engagement surface between the teeth 72. The teeth 72 are shaped to interlock with the teeth 50 of the movable sleeve 44 and abut the engagement surface of the movable sleeve 44. As shown in FIG. 10, the teeth 72 are located on a forward face of the second coupling portion 28.

The teeth 72 extend longitudinally along the axis of the sway bar assembly 20. The illustrated embodiment shows four teeth 72 on the second coupling portion 28, but fewer or greater dogs are contemplated (e.g., three, four, five, six, seven, eight, nine, ten). The illustrated embodiment shows equally spaced teeth 72 on the second coupling, but different configurations are contemplated as discussed above. Preferably, the teeth 50, 72 are offset from one another (e.g., rotated clockwise with respect to each other) to permit interlocking.

Referring to FIGS. 2 and 8, the second outer sway bar 24 is held in rotational position relative to the second linking arm 102 by the engagement feature 64 of the first end 60 coupled with the engagement feature of the second linking arm 102. The second coupling portion 28 is held in rotational position relative to the second outer sway bar 24 by the engagement feature 68 coupled with the engagement feature 66 on the second end 62 of the second outer sway bar 24. Accordingly, second coupling portion 28 generally is fixed against rotation (as opposed to rotation caused by torsion of the first outer sway bar 22) relative to the second linking arm 102.

FIGS. 11-14 are perspective and cross-sectional views of the housing. The illustrated housing includes three segments: a first segment 76, a central segment 78, and a second segment 80. The first segment 76, the central segment 78, and the second segment 80 include a central lumen there through. The first segment 76 includes a lumen 82 configured to receive the first outer sway bar 22 and the inner sway bar 23. In some embodiments, the first segment 76 includes a recess to abut the spacer 47. The central segment 78 includes a lumen 84 configured to accept the first coupling portion 26, the second coupling portion 28, the first outer sway bar 22, the second outer sway bar 24, and the inner sway bar 23. The second segment 80 includes a lumen 86 configured to accept the second outer sway bar 24 and the inner sway bar 23. In some embodiments, the second segment 80 includes a recess to abut the second coupling portion 28. The housing can include an inlet 112 or port configured to accept a fluid. In some embodiments, the inlet 112 is located on the second segment 80.

The first segment 76, the central segment 78, and the second segment 80 can be coupled in any suitable manner. In the illustrated arrangement, the first segment 76, the central segment 78, and the second segment 80 are separate components coupled together by one or more suitable fasteners, such as rivets or screw, for example. The first segment 76 and the second segment 80 include an elongated body portion that is coupled to the wall of the central segment 78. Preferably, the elongated body portion of the first segment 76, the central segment 78, and the elongated body portion of the second segment 80 have the same diameter. That is, in some arrangements, the elongated body portion of the first segment 76, the central segment 78, and the elongated body portion of the second segment 80 is of substantially the same height. Such an arrangement increases the overall strength and rigidity of the housing. In some embodiments, the central segment 78 is unitary with, or formed from the material of, the first segment 76 and/or the second segment 80. Each of the first segment 76 and the second segment 80 can define a ramped surface. The ramped surface is angled to reduce the overall size and shape of the housing. Other shapes and configurations for the housing are contemplated.

The first segment 76 includes a groove 88. The first outer sway bar 22 includes a groove 90, see FIG. 4. A retaining member 92, for example an O-ring, is retained within the grooves 88, 90. The second segment 80 includes a groove 94. The second outer sway bar 24 includes a groove 96, see FIG. 8. A retaining member 98, for example an O-ring, is retained within the grooves 94, 96. The retaining members 92, 98 permit flexibility of the first outer sway bar 22 with respect to the second outer sway bar 24. The retaining members 92, 98 can be wiper seals to reduce the likelihood of particles entering the housing. The housing protects the first coupling portion 26 and the second coupling portion 28 from foreign particles, reducing the likelihood of excess wear on the first coupling portion 26 and the second coupling portion 28. The housing does not necessarily rigidly couple the first outer sway bar 22 and the second outer sway bar 24. Rather, the housing is maintained at a set distance from the first outer sway bar 22 and the second outer sway bar 24 by the flexible retaining members 92, 98.

Figure 11:
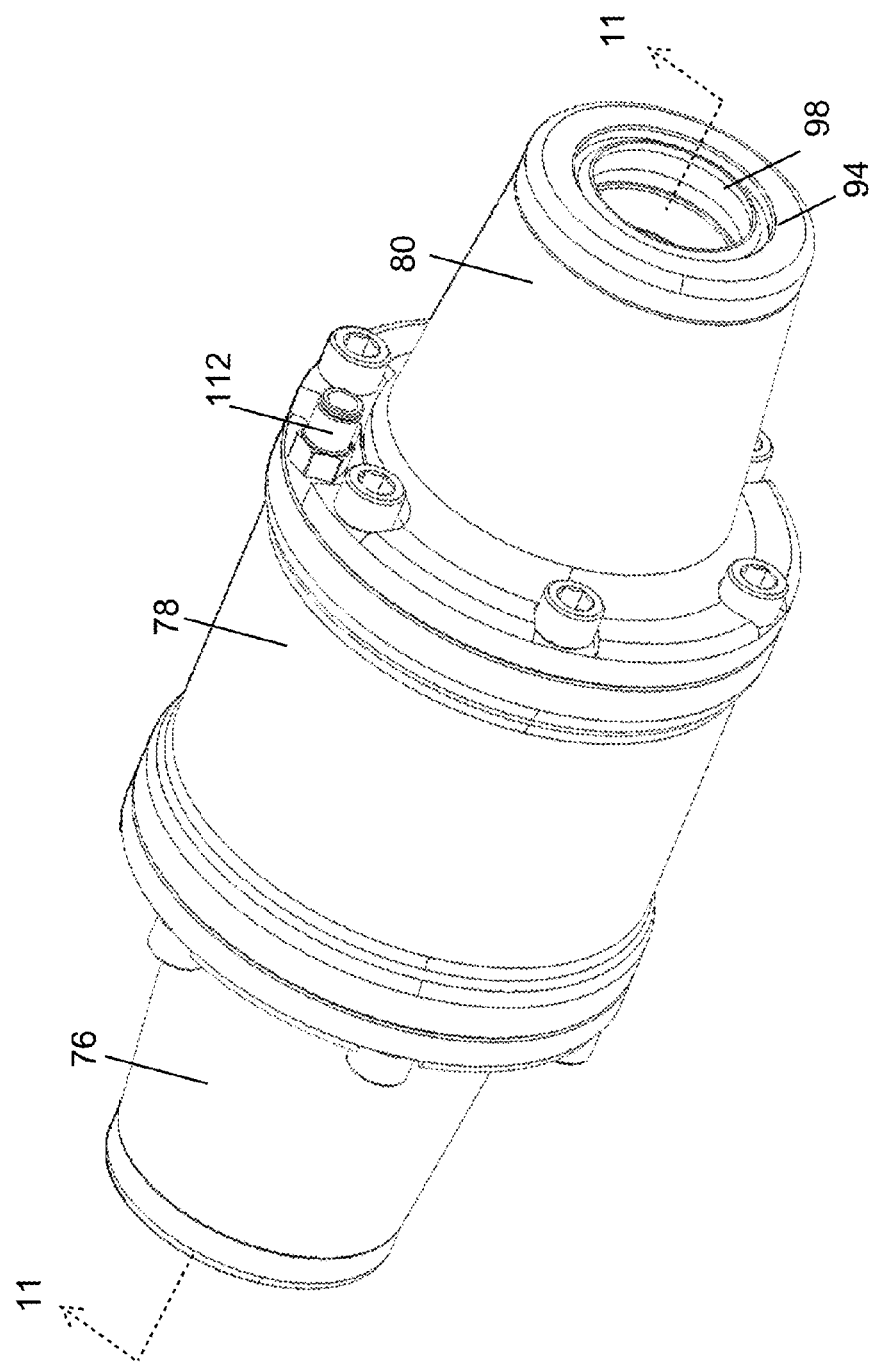
FIG. 11 is a perspective view of the housing of FIG. 1.
Figure 12:
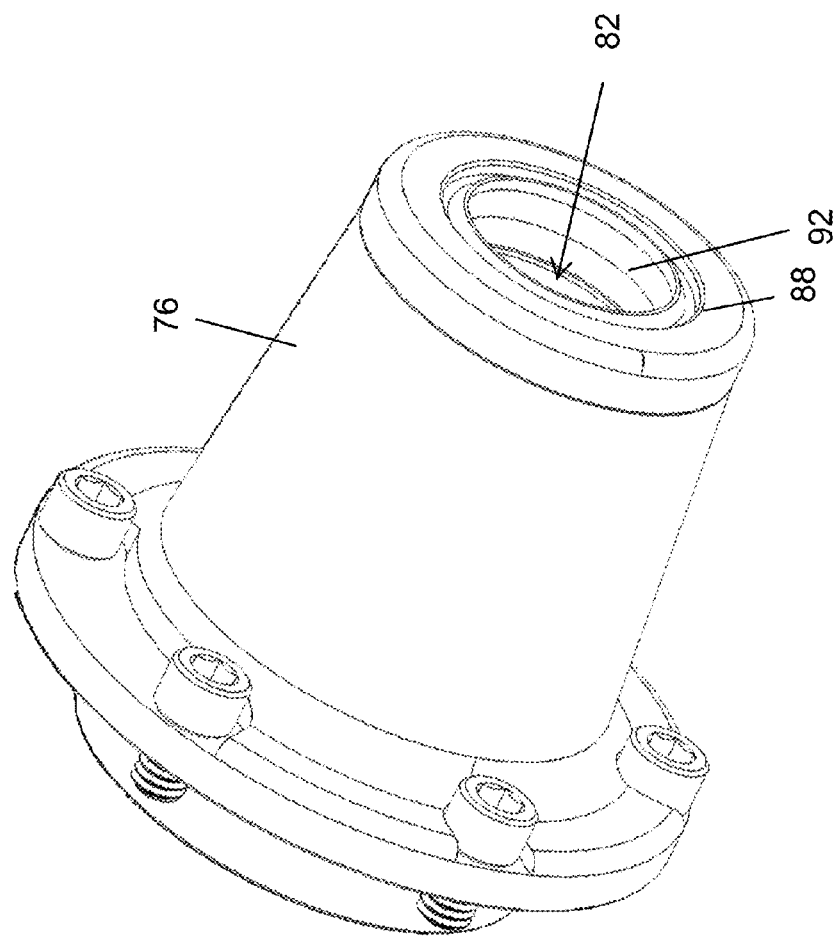
FIG. 12 is a perspective view of the first segment of the housing of FIG. 1.

FIG. 13 is a longitudinal cross-sectional view of the central segment 78 taken along the line 11-11 of FIG. 11 with the movable sleeve 44, the hub 42, and the spacer 47 disposed within. The central segment 78 includes the lumen 84. The lumen 84 includes a smaller diameter portion 83 and a larger diameter portion 85. As mentioned herein, the movable sleeve 44 can include the first groove 52 and the second groove 74. The first sealing member 114 can be retained in the groove 52 and the second sealing member 116 can be retained in the groove 74. The first sealing member 114 can abut the smaller diameter portion 83 of the central segment 78. The second sealing member 116 can abut the larger diameter portion 85 of the central segment 78. The sealing members 114, 116 can slide relative to the lumen 84. The sealing members 114, 116 can create a fluid seal between the movable sleeve 44 and the central segment 78.

In some embodiments, a variable volume chamber 79 is created between the movable sleeve 44 and the central segment 78. The chamber 79 can accept a fluid. The fluid can be liquid or gas. As the chamber 79 is filled with fluid, the fluid exerts pressure on the movable sleeve 44. For example, in the illustrated configuration, a surface defined by the step between the smaller diameter portion and the larger diameter portion of the sleeve 44 can receive the force of the fluid in the chamber 79, which causes movement of the movable sleeve 44.

The movable sleeve 44 moves to enlarge the chamber 79 by traveling axially along the first outer sway bar 22 toward the spacer 47. The movable sleeve 44 slides longitudinally within the central segment 78 in response to a fluid entering the chamber 79. FIG. 13 shows the movable component abutting the spacer 47, preventing further longitudinal movement. The movable sleeve 44 slides along the hub 42. The movable sleeve 44 is resists rotation with respect to the hub 42 due the engagement features 46, 48. The movable sleeve 44 compresses the spring 56 as it moves in response to a fluid entering the chamber 79. The force exerted by the fluid overcomes the biasing force of the spring 56, as described herein.

FIGS. 15 and 16 are perspective and side views of the first coupling portion 26 and the second coupling portion 28 engaged. When the two portions 26, 28 are engaged, the plurality of teeth 50 of the movable sleeve 44 of the first coupling portion 26 engage the plurality of teeth 72 of the second coupling portion 28. In some embodiments, a face of the first coupling portion 26 abuts the plurality of teeth 72 on the second coupling portion 28 and/or a face of the second coupling portion 28 abuts the plurality of teeth 50 on the movable sleeve 44. The movable sleeve 44 is biased toward the second coupling portion 28 by the spring 56. The movable sleeve 44 slides along the hub 42 due to the force of the spring 56 until the teeth 50, 72 interlock. The movable component is biased in the direction of the arrow shown in FIG. 15.

In the engaged configuration, the first outer sway bar 22 is engaged with the second outer sway bar 24. The first outer sway bar 22 (not shown) is coupled to the hub 42 of the first coupling portion 26. The hub 42 is coupled to the movable sleeve 44 via the second engagement features 46, 48. The spring 56 can be disposed within the movable sleeve 44 and biases the movable sleeve 44 toward the second coupling portion 28. The movable sleeve 44 slides longitudinally along the second engagement features 46 under the influence of the spring 56, toward the second coupling portion 28. The plurality of teeth 50 of the movable sleeve 44 engage with the plurality of teeth 72 on the second coupling portion 28. The second coupling portion 28 is coupled to the second sway bar 24 (not shown).

Referring again to FIG. 15, in the engaged configuration, the first coupling portion 26 and the second coupling portion 28 engage to form a rigid body. The first outer sway bar 22, the second outer sway bar 24, the first coupling portion 26, and the second coupling portion 28 form a rigid body. The rigid body acts as a unitary bar to stabilize the vehicle. The rigid body is capable of transmitting torque as if the outer sway bar were unitarily formed. The first outer sway bar 22 and the second outer sway bar 24 have a larger diameter than the inner sway bar 23. Due to the design including the diameter of the first outer sway bar 22 and the second outer sway bar 24, the vehicle has different characteristics related to roll and handling when the first coupling portion 26 is engaged with the second coupling portion 28. In some embodiments, the default position is the engaged configuration wherein the first coupling portion 26 and the second coupling portion 28 engage.

Figure 17:
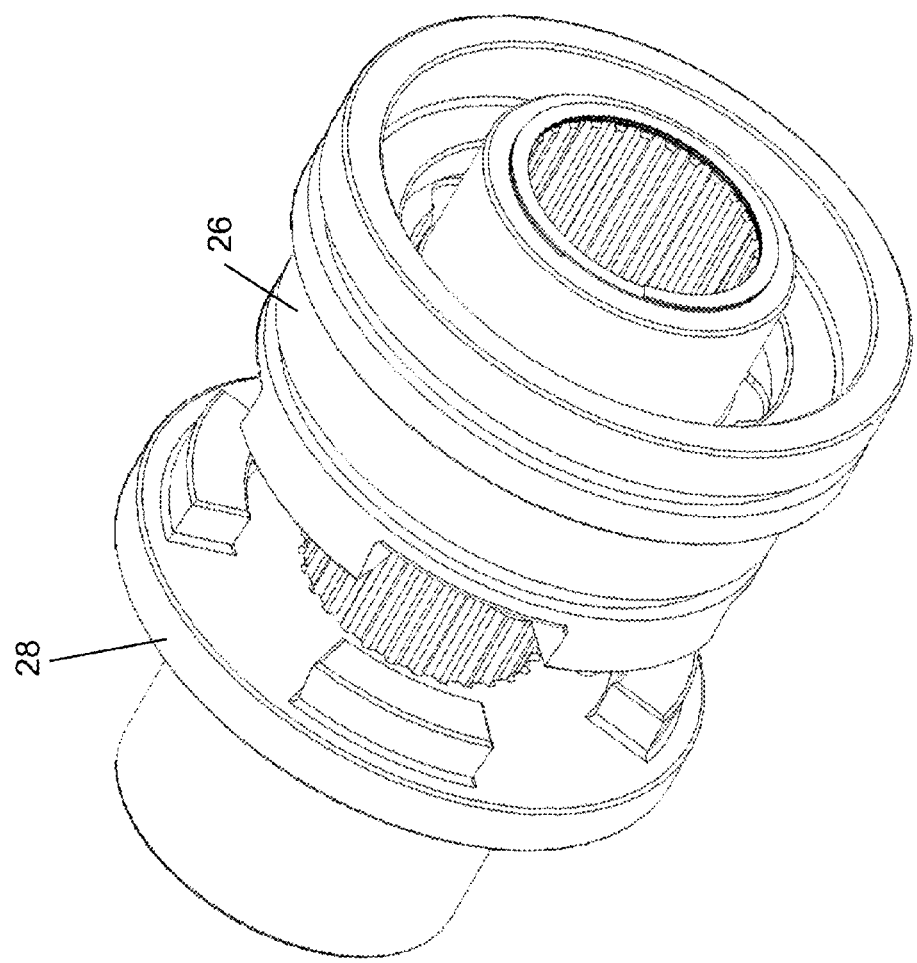
FIG. 17 is a perspective view of the first coupling and the second coupling of FIG. 1 disengaged.
Figure 18:
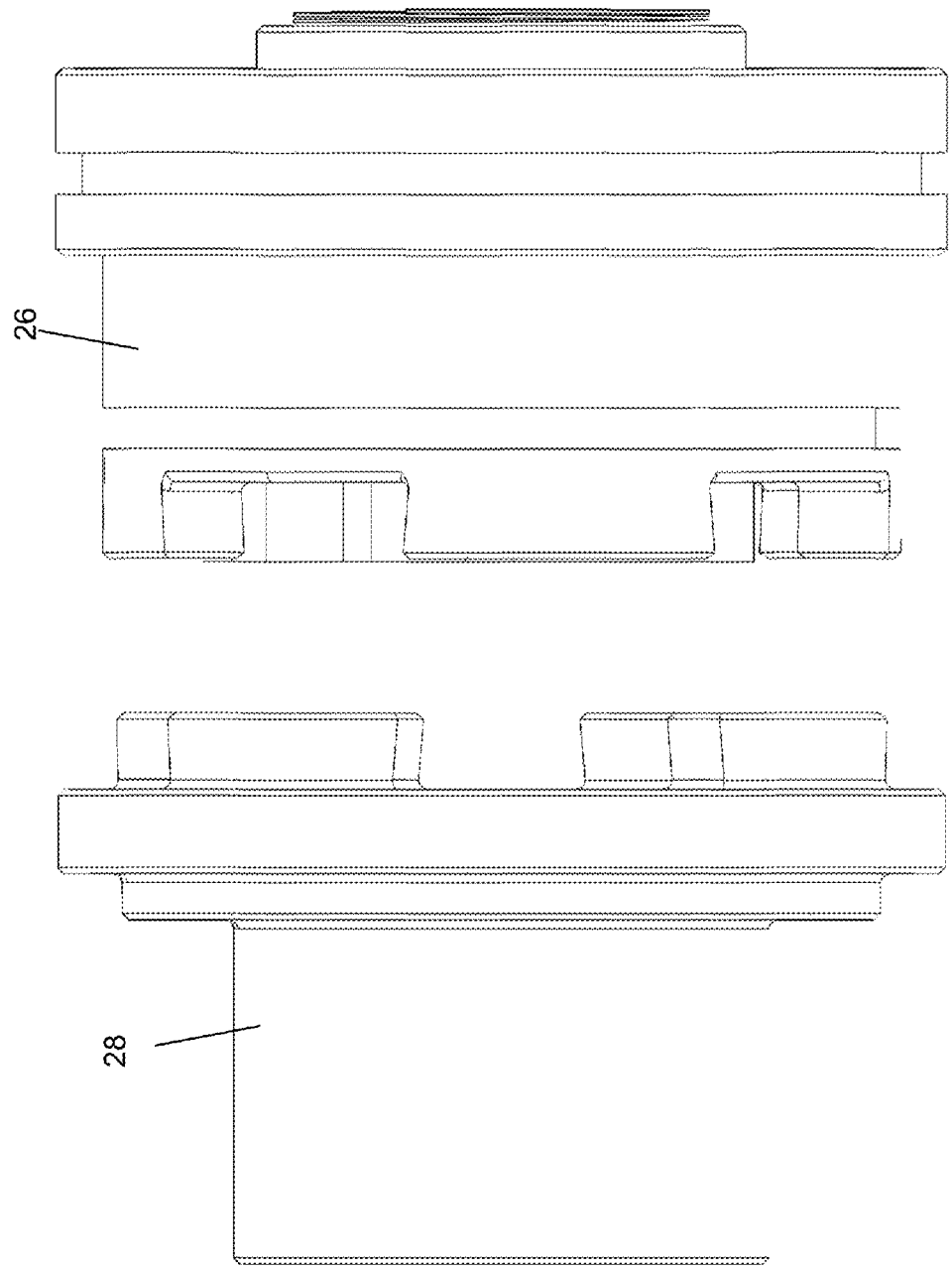
FIG. 18 is a side view of the first coupling and the second coupling of FIG. 1 disengaged.

FIGS. 17 and 18 are perspective and side views of the first coupling portion 26 and the second coupling portion 28 disengaged. As mentioned herein, the chamber 79 can be created between the movable sleeve 44 and the central segment 78. As the chamber 79 is filled with fluid, the movable sleeve 44 will slide along the hub 42. The movable sleeve 44 moves longitudinally away from the second coupling portion 28.

In the disengaged configuration, the first outer sway bar 22 is disengaged from the second outer sway bar 24. As mentioned herein, the first outer sway bar 22 is coupled to the hub 42 of the first coupling portion 26. The hub 42 is coupled to the movable sleeve 44 via the second engagement features 46, 48. To achieve the disengaged configuration, the spring 56 is compressed by the fluid, moving the movable sleeve 44 away from the second coupling portion 28. The movable sleeve 44 slides longitudinally along the second engagement features 46 away from the second coupling portion 28. The plurality of teeth 50 of the movable sleeve 44 disengage with the plurality of teeth 72 on the second coupling portion 28. The second coupling portion 28 is coupled to the second outer sway bar 24.

In the disengaged configuration, the first coupling portion 26 and the second coupling portion 28 are not engaged and do not form a rigid body. The first outer sway bar 22 is uncoupled from the second outer sway bar 24. In the disengaged configuration, the inner sway bar 23 extends between the passenger side and the driver side, from the first hubcap 104 to the second hubcap 106. The inner sway bar 23 controls roll of the body of the vehicle. The inner sway bar 23 has a smaller diameter than the first outer sway bar 22 and the second outer sway bar 24. Due to the design of the inner sway bar 23, including the diameter of the inner sway bar 23, the vehicle has different characteristics related to roll and handling. The inner sway bar 23 is more compliant, leading to a less stiff feel for the driver.

The fluid will maintain the disengaged configuration until the pressure is released from the chamber 79. When the pressure is released from the chamber 79 between movable sleeve 44 and the central segment 78 of the housing, the spring 56 biases the movable sleeve 44 toward the second coupling portion 28. The sway bar assembly 20 returns to the default position, which is the engaged configuration in the illustrated embodiment. If the chamber 79 leaks fluid, then the sway bar assembly 20 also returns to the default position. If the inlet 112 or other features of the fluid exchange fail, then the sway bar assembly 20 remains in, or returns to, the default position.

Figure 19:
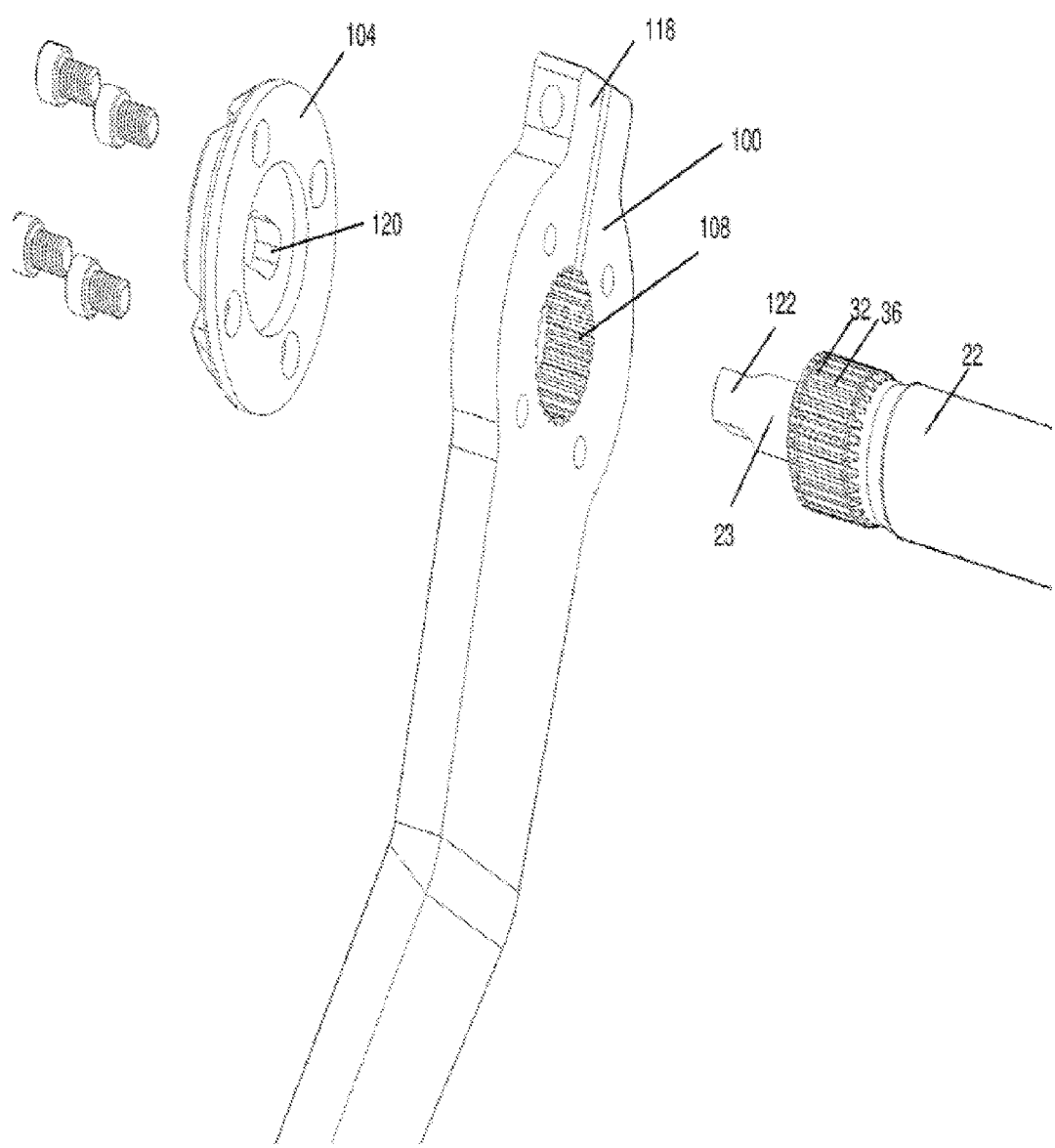
FIG. 19 is a perspective view of a first hubcap and first linking arm of the sway bar of FIG. 1.

FIG. 19 is a perspective view of the first hubcap 104 and the first linking arm 100 of the sway bar assembly 20. As mentioned herein, the first end 32 of the first outer sway bar 22 can include an engagement feature 36. The first linking arm 100 can include an engagement feature 108 to complement the engagement feature 36 of the first end 32. In some embodiments, the first end 32 can include retaining member (e.g., O-rings) that facilitate the retention of the first outer sway bar 22 within the first linking arm 100. In some embodiments, the first linking arm 100 can include a clamp 118 near the engagement feature 108. The clamp 118 can be compressed to engage the engagement features 36, 108. The clamp 118 can facilitate the assembly of the sway bar assembly 20. The linking arm 102 (not shown) can include engagement features 110 (not shown) and similar features to the linking arm 100 as shown in FIG. 19. In some embodiments, the first end 60 of the second outer sway bar 24 can include retaining member (e.g., O-rings) that facilitate the retention of the second outer sway bar 24 within the second linking arm 102.

The first hubcap 104 can be rigidly coupled to the first linking arm 100. The first hubcap 104 can include seat 120. The seat 120 can engage the first end 122 of the inner sway bar 23. The first end 122 of the inner sway bar 23 can have non-uniform shape. The non-uniform shape can reduce or eliminate the likelihood of rotation of the inner sway bar 23 with respect to the first hubcap 104. The second end (not shown) of the inner sway bar 23 and the second hubcap 106 can have similar features, as shown in FIG. 19. The illustrated first hubcap 104 includes fasteners, such as screws. The illustrated fasteners are generally cylindrical in shape. However, other suitable shapes may also be used. In some embodiments, the fasteners may compress the clamp 118 of the first linking arm 100. Although four fasteners are shown, other numbers of fasteners are also possible. The fasteners are configured to engage mounting holes in the first hubcap 104 and mounting holes in the first linking arm 100.

The components of the sway bar assembly 20 may be constructed of any suitable material and by any suitable manufacturing process. However, in some embodiments, the components of the sway bar assembly 20 are constructed from suitable metal materials (e.g., steel materials). The components can be shaped by any suitable process, including bending or roll forming techniques, for example but without limitation.

Figure 20:
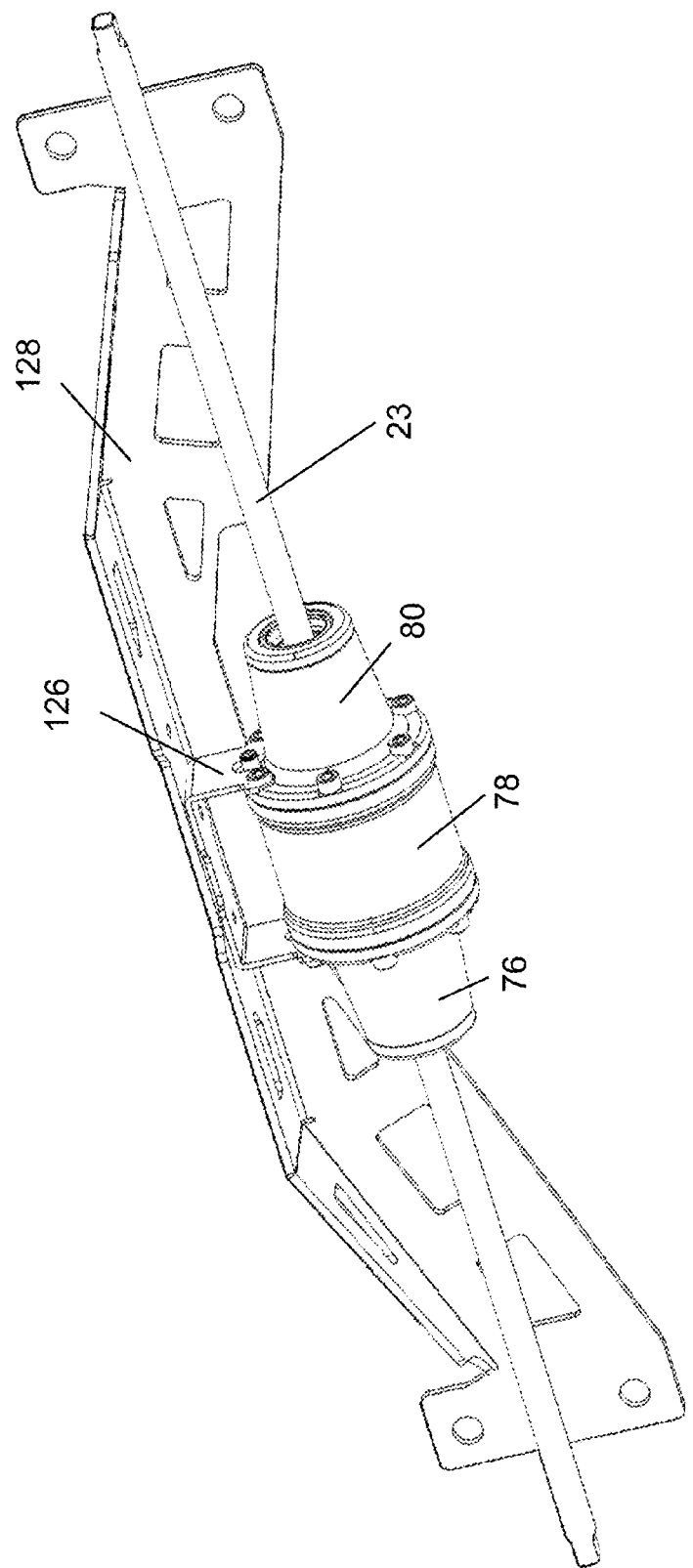
FIG. 20 is a perspective view of a mounting plate and a mounting bracket coupled to the housing of the sway bar of FIG. 1.
Figure 21:
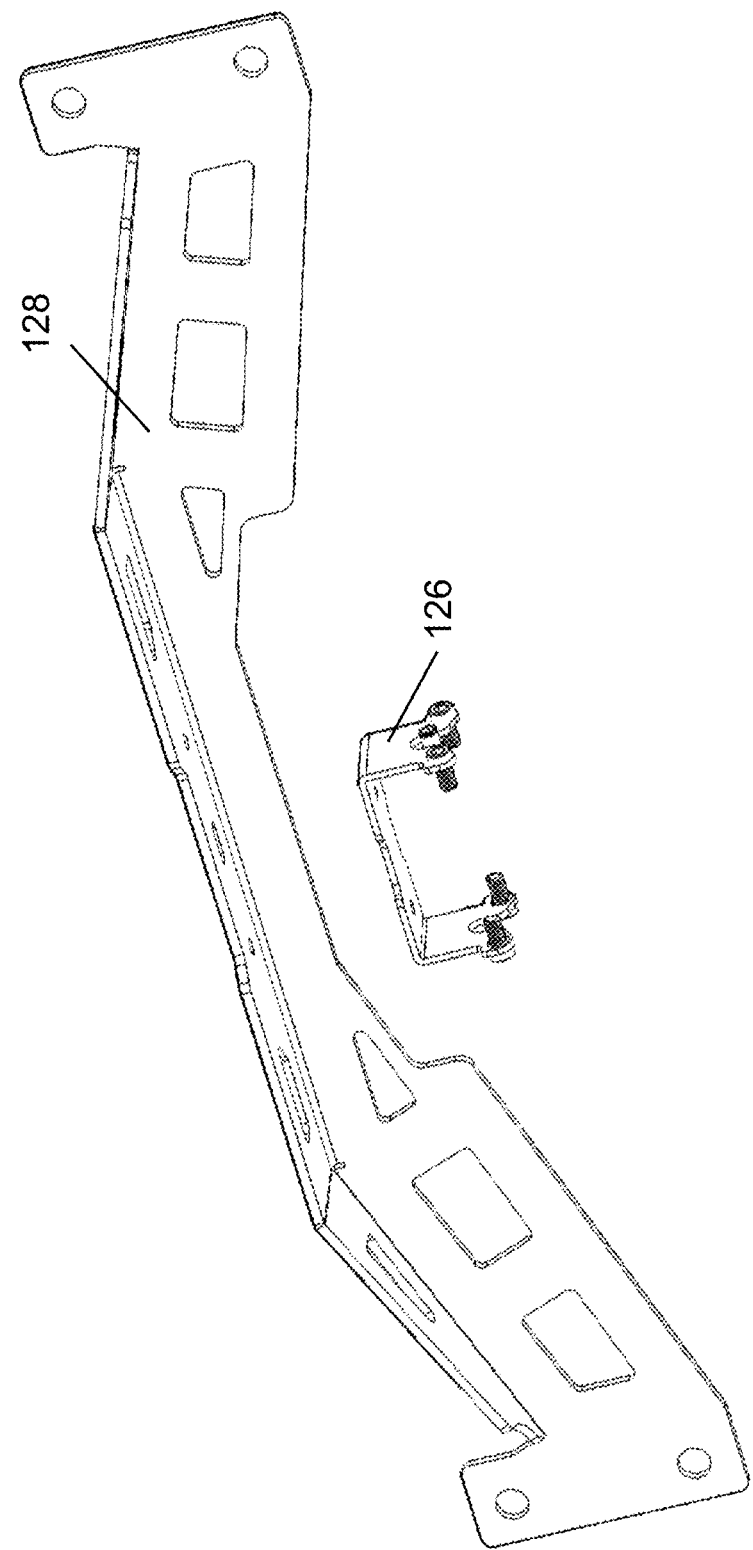
FIG. 21 is a perspective view of the mounting bracket and mounting plate of FIG. 20.

FIGS. 20 and 21 are perspective views of a mounting bracket 126 and a mounting plate 128. The mounting bracket 126 can be coupled to the housing 76, 78, 80. In the illustrated embodiment, the mounting bracket 126 is coupled to the first segment 76 and the second segment 80. The mounting bracket 126 can include holes to accept the fasteners that couple the first segment 76 and the second segment 80 to the central segment 78. The mounting bracket 126 can span the central segment 78, and in some embodiments, is about the same length as the central segment 78.

The mounting plate 128 can be coupled to the mounting bracket 126. In some embodiments, the mounting plate 128 can be configured to replace or can be a stock mounting plate 128 that can be coupled to a stock sway bar. In other embodiments, the mounting plate 128 is specially designed to support the sway bar assembly 20. The mounting plate 128 can couple to the underside of the vehicle. The mounting plate 128 can be designed based on the make and the model of the vehicle. The mounting plate 128 can be designed to align with the original mount points of the vehicle. The mounting plate 128 and other components of the sway bar assembly 20 can be connected to the vehicle by using suitable fasteners. The mounting bracket 126 and the mounting plate 128 can reduce or eliminate the likelihood of the first outer sway bar 22 and the second outer sway bar 24 rotating significantly when the first outer sway bar 22 and the second outer sway bar 24 are disengaged.

In operation, the sway bar assembly 20 is coupled to the vehicle with the mounting plate 128 and the mounting bracket 126. Once mounted, the linking arms 100, 102 can be connected to the vehicle. The linking arms 100, 102 can be moved relative to one another (if necessary) along the first outer sway bar 22 and the second outer sway bar 24 when being coupled together. A fluid source can be connected to the fluid inlet 112. The fluid source can be a source of compressed air or a pump or the like. The fluid source can be actuated in any suitable manner to disengage the first coupling portion 26 from the second coupling portion 28. In some configurations, the fluid source can be controlled remotely relative to the rest of the sway bar assembly 20, such as from within the cab of the vehicle. In some configurations, a switch, pushbutton or the like can be mounted within the cab of the vehicle. Operation of the switch, pushbutton or the like can cause pressurization of the chamber within the housing of the sway bar assembly 20.

Although this invention has been disclosed in the context of certain preferred embodiments and examples, it will be understood by those skilled in the art that the present invention extends beyond the specifically disclosed embodiments to other alternative embodiments and/or uses of the invention and obvious modifications and equivalents thereof. In particular, while the present sway bars have been described in the context of particularly preferred embodiments, the skilled artisan will appreciate, in view of the present disclosure, that certain advantages, features and aspects of the assemblies may be realized in a variety of other applications, many of which have been noted above. Additionally, it is contemplated that various aspects and features of the invention described can be practiced separately, combined together, or substituted for one another, and that a variety of combination and sub combinations of the features and aspects can be made and still fall within the scope of the invention. Thus, it is intended that the scope of the present invention herein disclosed should not be limited by the particular disclosed embodiments described above, but should be determined only by a fair reading of the claims.

What is claimed is:

1. A sway bar assembly comprising:
   an outer sway bar assembly comprising:
   a first outer sway bar,
   a first coupling portion configured to longitudinally slide relative to the first outer sway bar,
   a second outer sway bar, a second coupling portion;

an inner sway bar disposed within the first outer sway bar and the second outer sway bar, the inner sway bar extending at least the length of the first outer sway bar or the length of the second outer sway bar; and a biasing element that biases the first coupling portion toward the second coupling portion such that the first coupling portion and the second coupling portion mate.

2. The sway bar assembly of claim 1, further comprising a mounting arrangement configured to mount the sway bar assembly to a vehicle wherein the mounting arrangement comprises a first linking arm and a second linking arm.

3. The sway bar assembly of claim 2, wherein the first linking arm and the second linking arm are coupled together through the inner sway bar and disengageably coupled together through the outer sway bar assembly.

4. The sway bar assembly of claim 1, wherein the sway bar assembly comprises a remote activator configured to overcome the force of the biasing element to move the first coupling portion away from the second coupling portion such that the first coupling portion and the second coupling portion are separated.

5. A sway bar assembly comprising:
an outer sway bar assembly comprising:
a first outer sway bar,
a first coupling portion configured to longitudinally slide relative to the first outer sway bar
a second outer sway bar,
a second coupling portion; and
an inner sway bar disposed within the first outer sway bar and the second outer sway bar, the inner sway bar extending at least the length of the first outer sway bar or the length of the second outer sway bar,
wherein the first coupling portion comprise dogs.

6. The sway bar assembly of claim 5, wherein the second coupling portion comprise dogs.

7. A sway bar assembly comprising:
an outer sway bar assembly comprising:
a first outer sway bar,
a first coupling portion configured to longitudinally slide relative to the first outer sway bar,
a second outer sway bar,
a second coupling portion;
an inner sway bar disposed within the first outer sway bar and the second outer sway bar, the inner sway bar extending at least the length of the first outer sway bar or the length of the second outer sway bar; and
a housing, wherein the housing encloses the first coupling portion and the second coupling portion.

8. The sway bar assembly of claim 7, wherein the housing is sized to permit the sliding of the first coupling portion with respect to the first outer sway bar to disengage the first coupling portion from the second coupling portion.

9. The sway bar assembly of claim 7, wherein the housing is configured to accept an actuation fluid to move the first coupling portion relative to the second coupling portion.

10. A sway bar assembly comprising:
an outer sway bar assembly comprising:
a first outer sway bar,
a first coupling portion configured to longitudinally slide relative to the first outer sway bar,
a second outer sway bar,
a second coupling portion; and
an inner sway bar disposed within the first outer sway bar and the second outer sway bar, the inner sway bar extending at least the length of the first outer sway bar or the length of the second outer sway bar, wherein the inner sway bar extends the length of the outer sway bar assembly.

11. A sway bar assembly comprising:
an outer sway bar assembly comprising:
a first outer sway bar,
a first coupling portion,
a second outer sway bar,
a second coupling portion; and
an inner sway bar disposed within the first outer sway bar and the second outer sway bar,
wherein the first outer sway bar and the second outer sway bar are configured to transmit torque when the first coupling portion engages the second coupling portion, wherein the inner sway bar transmits torque when the first coupling portion disengages the second coupling portion and further wherein engaging the first outer sway bar with the second outer sway bar further comprises engaging dogs of the first coupling portion with dogs of the second coupling portion.

12. The sway bar assembly of claim 11, wherein engaging the first outer sway bar with the second outer sway bar further comprises transmitting torque as if the first outer sway bar and the second outer sway bar were unitarily formed.

13. The sway bar assembly of claim 11, further comprising a mounting arrangement configured to mount the sway bar assembly to a vehicle wherein the mounting arrangement comprises a first linking arm and a second linking arm.

14. The sway bar assembly of claim 13, wherein the first linking arm and the second linking arm are coupled together through the inner sway bar.

* * * * *